US007914377B2

(12) United States Patent
Benbrahim et al.

(10) Patent No.: US 7,914,377 B2
(45) Date of Patent: Mar. 29, 2011

(54) GAMING DEVICE WITH DYNAMIC PROGRESSIVE AND BONUS ARCHITECTURE

(75) Inventors: Jamal Benbrahim, Reno, NV (US); Dwayne R. Nelson, Las Vegas, NV (US); Warner R. Cockerille, Sparks, NV (US)

(73) Assignee: IGT, Reno, NV (US)

( * ) Notice: Subject to any disclaimer, the term of this patent is extended or adjusted under 35 U.S.C. 154(b) by 1177 days.

(21) Appl. No.: 11/557,395

(22) Filed: Nov. 7, 2006

(65) Prior Publication Data

US 2008/0108423 A1 May 8, 2008

(51) Int. Cl.
*G06F 17/00* (2006.01)

(52) U.S. Cl. ........................................................ 463/25

(58) Field of Classification Search ............... 463/16–25
See application file for complete search history.

(56) References Cited

U.S. PATENT DOCUMENTS 4,072,930 A 2/1978 Lucero et al.
4,679,143 A 7/1987 Hagiwara
4,805,907 A 2/1989 Hagiwara
4,837,728 A 6/1989 Barrie et al.
4,838,552 A 6/1989 Hagiwara
4,842,278 A 6/1989 Markowicz
4,844,464 A 7/1989 Berge
4,856,787 A 8/1989 Itkis
4,871,171 A 10/1989 Rivero
5,048,833 A 9/1991 Lamle
5,092,598 A 3/1992 Kamille
5,116,055 A 5/1992 Tracy
5,123,649 A 6/1992 Tiberio
5,249,800 A 10/1993 Hilgendorf et al.
5,275,400 A 1/1994 Weingardt
5,280,909 A 1/1994 Tracy
5,286,023 A 2/1994 Wood
5,292,127 A 3/1994 Kelly et al.
5,342,049 A 8/1994 Wichinsky et al.
5,344,144 A 9/1994 Canon
5,417,430 A 5/1995 Breeding
(Continued)

FOREIGN PATENT DOCUMENTS

AU 524709 9/1982
(Continued)

OTHER PUBLICATIONS

Aristrocrat Brochure, written by Aristocrat Gaming, published in 2004.

(Continued)

*Primary Examiner* — Ronald Laneau
(74) *Attorney, Agent, or Firm* — K&L Gates LLP

(57) ABSTRACT

A gaming device, a gaming system and a method for operating a gaming device or gaming system with a plurality of bonus and/or progressive outcomes is disclosed. The present disclosure provides a bonus and/or progressive architecture that enables a central controller to add or remove bonusing and/or progressive features from one or more gaming devices in a gaming system. In one embodiment, the central controller designates one or more game outcomes in a paytable as designated game outcomes. If the gaming device generates one of the designated game outcomes, the central controller dynamically determines a bonus award and/or a progressive award in conjunction with a manner of presenting the bonus award and/or the progressive award to the player of the gaming device. If the gaming device does not generate a designated game outcome, the gaming device provides the player an award that is associated with the generated outcome based on the paytable.

58 Claims, 11 Drawing Sheets

U.S. PATENT DOCUMENTS

| | | | |
|---|---|---|---|
| 5,472,194 | A | 12/1995 | Breeding et al. |
| 5,476,259 | A | 12/1995 | Weingardt |
| 5,489,101 | A | 2/1996 | Moody |
| 5,511,781 | A | 4/1996 | Wood |
| 5,531,441 | A | 7/1996 | Dabrowski et al. |
| 5,536,016 | A | 7/1996 | Thompson |
| 5,544,893 | A | 8/1996 | Jones et al. |
| 5,547,192 | A | 8/1996 | Ishibashi |
| 5,564,700 | A | 10/1996 | Celona |
| 5,584,485 | A | 12/1996 | Jone et al. |
| 5,584,763 | A | 12/1996 | Kelly et al. |
| 5,611,730 | A | 3/1997 | Weiss |
| 5,626,341 | A | 5/1997 | Jones |
| 5,645,486 | A | 7/1997 | Nagao et al. |
| 5,655,961 | A | 8/1997 | Acres et al. |
| 5,702,304 | A | 12/1997 | Acres et al. |
| 5,741,183 | A | 4/1998 | Acres et al. |
| 5,743,523 | A | 4/1998 | Kelly et al. |
| 5,743,800 | A | 4/1998 | Huard et al. |
| 5,752,882 | A | 5/1998 | Acres et al. |
| 5,761,647 | A | 6/1998 | Boushy |
| 5,762,552 | A | 6/1998 | Vuong |
| 5,766,076 | A | 6/1998 | Pease et al. |
| 5,779,545 | A | 7/1998 | Berg et al. |
| 5,779,547 | A | 7/1998 | SoRelle et al. |
| 5,816,918 | A | 10/1998 | Kelly et al. |
| 5,820,459 | A | 10/1998 | Acres et al. |
| 5,833,537 | A | 11/1998 | Barrie |
| 5,836,817 | A | 11/1998 | Acres et al. |
| 5,851,011 | A | 12/1998 | Lott |
| 5,851,149 | A | 12/1998 | Xidos et al. |
| 5,855,514 | A | 1/1999 | Kamille |
| 5,855,515 | A | 1/1999 | Pease et al. |
| 5,876,284 | A | 3/1999 | Acres et al. |
| 5,885,158 | A | 3/1999 | Torango et al. |
| 5,941,773 | A | 8/1999 | Harlick |
| 5,944,606 | A | 8/1999 | Gerow |
| 5,947,820 | A | 9/1999 | Morro et al. |
| 5,951,011 | A | 9/1999 | Potter et al. |
| 5,967,894 | A | 10/1999 | Kinoshita et al. |
| 5,976,015 | A | 11/1999 | Seelig et al. |
| 5,980,384 | A | 11/1999 | Barrie |
| 5,984,779 | A | 11/1999 | Bridgeman et al. |
| 5,989,121 | A | 11/1999 | Sakamoto |
| 5,993,316 | A | 11/1999 | Coyle et al. |
| 5,997,400 | A | 12/1999 | Seelig et al. |
| 6,001,016 | A | 12/1999 | Walker et al. |
| 6,004,207 | A | 12/1999 | Wilson, Jr. et al. |
| 6,007,427 | A | 12/1999 | Wiener |
| 6,012,982 | A | 1/2000 | Piechowiak et al. |
| 6,019,369 | A | 2/2000 | Nakagawa et al. |
| 6,033,307 | A | 3/2000 | Vancura |
| 6,039,648 | A | 3/2000 | Guinn et al. |
| 6,056,642 | A | 5/2000 | Bennett |
| 6,062,980 | A | 5/2000 | Luciano |
| 6,062,981 | A | 5/2000 | Luciano, Jr. |
| 6,068,553 | A | 5/2000 | Parker |
| 6,077,162 | A | 6/2000 | Weiss |
| 6,080,062 | A | 6/2000 | Olson |
| 6,089,977 | A | 7/2000 | Bennett |
| 6,089,980 | A | 7/2000 | Gauselmann |
| 6,102,400 | A | 8/2000 | Scott et al. |
| 6,110,041 | A | 8/2000 | Walker et al. |
| 6,110,043 | A | 8/2000 | Olsen |
| 6,126,542 | A | 10/2000 | Fier |
| 6,142,872 | A | 11/2000 | Walker et al. |
| 6,142,875 | A | 11/2000 | Kodachi et al. |
| 6,146,273 | A | 11/2000 | Olsen |
| 6,152,823 | A | 11/2000 | Lacoste et al. |
| 6,155,925 | A | 12/2000 | Giobbi et al. |
| 6,159,095 | A | 12/2000 | Frohm et al. |
| 6,159,096 | A | 12/2000 | Yoseloff |
| 6,159,097 | A | 12/2000 | Gura |
| 6,162,122 | A | 12/2000 | Acres et al. |
| 6,168,520 | B1 | 1/2001 | Baerlocher et al. |
| 6,174,233 | B1 | 1/2001 | Sunaga et al. |
| 6,174,235 | B1 | 1/2001 | Walker et al. |
| 6,183,366 | B1 | 2/2001 | Goldberg et al. |
| 6,193,606 | B1 | 2/2001 | Walker et al. |
| 6,203,010 | B1 | 3/2001 | Jorasch et al. |
| 6,203,429 | B1 | 3/2001 | Demar et al. |
| 6,203,430 | B1 | 3/2001 | Walker et al. |
| 6,206,374 | B1 | 3/2001 | Jones |
| 6,210,275 | B1 | 4/2001 | Olsen |
| 6,210,277 | B1 | 4/2001 | Stefan |
| 6,217,448 | B1 | 4/2001 | Olsen |
| 6,220,961 | B1 | 4/2001 | Keane et al. |
| 6,224,482 | B1 | 5/2001 | Bennett |
| 6,224,484 | B1 | 5/2001 | Okuda et al. |
| 6,231,445 | B1 | 5/2001 | Acres |
| 6,234,897 | B1 | 5/2001 | Frohm et al. |
| 6,238,287 | B1 | 5/2001 | Komori et al. |
| 6,238,288 | B1 | 5/2001 | Walker et al. |
| 6,241,608 | B1 | 6/2001 | Torango |
| 6,244,958 | B1 | 6/2001 | Acres |
| 6,254,483 | B1 | 7/2001 | Acres |
| 6,257,981 | B1 | 7/2001 | Acres et al. |
| 6,270,409 | B1 | 8/2001 | Shuster |
| 6,287,202 | B1 | 9/2001 | Pascal et al. |
| 6,293,866 | B1 | 9/2001 | Walker et al. |
| 6,299,165 | B1 | 10/2001 | Nagano |
| 6,309,298 | B1 | 10/2001 | Gerow |
| 6,309,299 | B1 | 10/2001 | Weiss |
| 6,312,330 | B1 | 11/2001 | Jones et al. |
| 6,315,660 | B1 | 11/2001 | DeMar et al. |
| 6,315,662 | B1 | 11/2001 | Jorasch et al. |
| 6,319,125 | B1 | 11/2001 | Acres |
| 6,322,078 | B1 | 11/2001 | Adams |
| 6,322,309 | B1 | 11/2001 | Thomas et al. |
| 6,328,649 | B1 | 12/2001 | Randall et al. |
| 6,336,857 | B1 | 1/2002 | McBride |
| 6,343,989 | B1 | 2/2002 | Wood et al. |
| 6,358,149 | B1 | 3/2002 | Schneider et al. |
| 6,361,441 | B1 | 3/2002 | Walker et al. |
| 6,371,852 | B1 | 4/2002 | Acres |
| 6,375,567 | B1 | 4/2002 | Acres |
| 6,375,569 | B1 | 4/2002 | Acres |
| 6,386,977 | B1 | 5/2002 | Hole |
| 6,398,218 | B1 | 6/2002 | Vancura |
| 6,406,369 | B1 | 6/2002 | Baerlocher et al. |
| 6,416,408 | B2 | 7/2002 | Tracy et al. |
| 6,416,409 | B1 | 7/2002 | Jordan |
| 6,419,583 | B1 | 7/2002 | Crumby et al. |
| 6,431,983 | B2 | 8/2002 | Acres |
| 6,435,511 | B1 | 8/2002 | Vancura et al. |
| 6,435,968 | B1 | 8/2002 | Torango |
| 6,439,995 | B1 | 8/2002 | Hughs-Baird et al. |
| 6,443,837 | B1 | 9/2002 | Jaffe et al. |
| 6,454,651 | B1 | 9/2002 | Yoseloff |
| 6,464,582 | B1 | 10/2002 | Baerlocher et al. |
| 6,471,591 | B1 | 10/2002 | Crumby |
| 6,506,118 | B1 | 1/2003 | Baerlocher et al. |
| 6,508,707 | B2 | 1/2003 | DeMar et al. |
| 6,511,375 | B1 | 1/2003 | Kaminkow |
| 6,511,376 | B2 | 1/2003 | Walker et al. |
| 6,514,141 | B1 | 2/2003 | Kaminkow et al. |
| 6,533,658 | B1 | 3/2003 | Walker et al. |
| 6,533,664 | B1 | 3/2003 | Crumby |
| 6,546,374 | B1 | 4/2003 | Esposito et al. |
| 6,554,283 | B2 | 4/2003 | Vancura et al. |
| 6,565,434 | B1 | 5/2003 | Acres |
| 6,565,436 | B1 | 5/2003 | Baerlocher |
| 6,569,015 | B1 | 5/2003 | Baerlocher et al. |
| 6,575,830 | B2 | 6/2003 | Baerlocher et al. |
| 6,575,832 | B1 | 6/2003 | Manfredi et al. |
| 6,589,115 | B2 | 7/2003 | Walker et al. |
| 6,592,460 | B2 | 7/2003 | Torango |
| 6,595,854 | B2 | 7/2003 | Hughs-Baird et al. |
| 6,599,185 | B1 | 7/2003 | Kaminkow et al. |
| 6,599,193 | B2 | 7/2003 | Baerlocher et al. |
| 6,607,437 | B2 | 8/2003 | Casey et al. |
| 6,609,971 | B2 | 8/2003 | Vancura |
| 6,609,973 | B1 | 8/2003 | Weiss |
| 6,616,531 | B1 | 9/2003 | Mullins |
| 6,620,046 | B2 | 9/2003 | Rowe |
| 6,626,758 | B1 | 9/2003 | Parham et al. |
| 6,656,047 | B1 | 12/2003 | Tarantino et al. |

| | | | | |
|---|---|---|---|---|
| 6,656,048 | B2 | 12/2003 | Olsen | |
| 6,656,052 | B2 | 12/2003 | Abramopoulos et al. | |
| 6,659,864 | B2 | 12/2003 | McGahn et al. | |
| 6,666,765 | B2 | 12/2003 | Vancura | |
| 6,682,419 | B2 | 1/2004 | Webb et al. | |
| 6,682,420 | B2 | 1/2004 | Webb et al. | |
| 6,688,977 | B1 | 2/2004 | Baerlocher et al. | |
| 6,692,355 | B2 | 2/2004 | Baerlocher et al. | |
| 6,712,695 | B2 | 3/2004 | Mothwurf et al. | |
| 6,712,697 | B2 | 3/2004 | Acres | |
| 6,726,563 | B1 | 4/2004 | Baerlocher et al. | |
| 6,746,328 | B2 | 6/2004 | Cannon et al. | |
| 6,749,510 | B2 | 6/2004 | Giobbi | |
| 6,758,750 | B2 | 7/2004 | Baerlocher et al. | |
| 6,776,714 | B2 | 8/2004 | Ungaro et al. | |
| 6,776,715 | B2 | 8/2004 | Price | |
| 6,780,110 | B2 | 8/2004 | Baerlocher et al. | |
| 6,790,141 | B2 | 9/2004 | Muir | |
| 6,800,030 | B2 | 10/2004 | Acres | |
| 6,805,352 | B2 | 10/2004 | Hunter | |
| 6,811,483 | B1 | 11/2004 | Webb et al. | |
| 6,814,664 | B2 | 11/2004 | Baerlocher et al. | |
| 6,832,958 | B2 | 12/2004 | Acres et al. | |
| 6,837,788 | B2 | 1/2005 | Cannon | |
| 6,852,030 | B2 | 2/2005 | Baerlocher et al. | |
| 6,869,361 | B2 | 3/2005 | Sharpless et al. | |
| 6,884,168 | B2 | 4/2005 | Wood et al. | |
| 6,887,154 | B1 | 5/2005 | Luciano, Jr. et al. | |
| 6,899,625 | B2 | 5/2005 | Luciano, Jr. et al. | |
| 6,910,964 | B2 | 6/2005 | Acres | |
| 6,913,532 | B2 | 7/2005 | Baerlocher et al. | |
| 6,918,832 | B2 | 7/2005 | Baerlocher et al. | |
| 6,918,834 | B2 | 7/2005 | Vancura | |
| 6,935,958 | B2 | 8/2005 | Nelson | |
| 6,939,234 | B2 | 9/2005 | Beatty | |
| 6,955,600 | B2 | 10/2005 | Glavich et al. | |
| 6,966,834 | B1 | 11/2005 | Johnson | |
| 7,029,395 | B1 | 4/2006 | Baerlocher | |
| 2001/0049303 | A1 | 12/2001 | Found | |
| 2002/0045475 | A1 | 4/2002 | Glavich et al. | |
| 2002/0071557 | A1 | 6/2002 | Nguyen | |
| 2002/0094855 | A1 | 7/2002 | Berman | |
| 2002/0116615 | A1 | 8/2002 | Nguyen et al. | |
| 2002/0138594 | A1 | 9/2002 | Rowe | |
| 2002/0142822 | A1 | 10/2002 | Baerlocher et al. | |
| 2002/0142829 | A1 | 10/2002 | Inoue | |
| 2002/0152120 | A1 | 10/2002 | Howington | |
| 2002/0165023 | A1 | 11/2002 | Brosnan et al. | |
| 2002/0187834 | A1 | 12/2002 | Rowe et al. | |
| 2002/0198036 | A1 | 12/2002 | Baerlocher et al. | |
| 2003/0027625 | A1 | 2/2003 | Rowe | |
| 2003/0027630 | A1 | 2/2003 | Kelly et al. | |
| 2003/0040360 | A1 | 2/2003 | Kaminkow | |
| 2003/0045350 | A1 | 3/2003 | Baerlocher et al. | |
| 2003/0050111 | A1 | 3/2003 | Saffari | |
| 2003/0054878 | A1 | 3/2003 | Benoy et al. | |
| 2003/0060254 | A1 | 3/2003 | Cuddy et al. | |
| 2003/0060266 | A1 | 3/2003 | Baerlocher | |
| 2003/0060269 | A1 | 3/2003 | Paulsen et al. | |
| 2003/0060272 | A1 | 3/2003 | Glavich et al. | |
| 2003/0060279 | A1 | 3/2003 | Torango | |
| 2003/0064772 | A1 | 4/2003 | Tempest et al. | |
| 2003/0064773 | A1 | 4/2003 | Baerlocher et al. | |
| 2003/0064785 | A1 | 4/2003 | Stone et al. | |
| 2003/0069056 | A1 | 4/2003 | Cormack et al. | |
| 2003/0069064 | A1 | 4/2003 | Ainsworth | |
| 2003/0073482 | A1 | 4/2003 | Baerlocher et al. | |
| 2003/0083943 | A1 | 5/2003 | Adams et al. | |
| 2003/0092484 | A1 | 5/2003 | Schneider et al. | |
| 2003/0119576 | A1* | 6/2003 | McClintic et al. | 463/20 |
| 2003/0119583 | A1 | 6/2003 | Kaminkow et al. | |
| 2003/0162584 | A1 | 8/2003 | Hughs-Baird et al. | |
| 2003/0162585 | A1 | 8/2003 | Bigelow et al. | |
| 2003/0181231 | A1 | 9/2003 | Vancura et al. | |
| 2003/0199321 | A1 | 10/2003 | Williams | |
| 2003/0207710 | A1 | 11/2003 | Rodgers et al. | |
| 2003/0211879 | A1 | 11/2003 | Englman | |
| 2003/0211884 | A1 | 11/2003 | Gauselmann | |
| 2003/0216166 | A1 | 11/2003 | Baerlocher et al. | |
| 2003/0222402 | A1 | 12/2003 | Olive | |
| 2003/0228904 | A1 | 12/2003 | Acres et al. | |
| 2003/0232647 | A1 | 12/2003 | Moser | |
| 2003/0236116 | A1 | 12/2003 | Marks et al. | |
| 2004/0009811 | A1 | 1/2004 | Torango | |
| 2004/0029631 | A1 | 2/2004 | Duhamel | |
| 2004/0048649 | A1 | 3/2004 | Peterson et al. | |
| 2004/0048652 | A1 | 3/2004 | Ching et al. | |
| 2004/0053672 | A1 | 3/2004 | Baerlocher | |
| 2004/0053683 | A1 | 3/2004 | Hartl et al. | |
| 2004/0072615 | A1 | 4/2004 | Maya et al. | |
| 2004/0087368 | A1 | 5/2004 | Gavselmann | |
| 2004/0137982 | A1 | 7/2004 | Cuddy et al. | |
| 2004/0147306 | A1 | 7/2004 | Randall et al. | |
| 2004/0152509 | A1 | 8/2004 | Hornik et al. | |
| 2004/0171416 | A1 | 9/2004 | Baerlocher et al. | |
| 2004/0171420 | A1 | 9/2004 | Baerlocher et al. | |
| 2004/0235552 | A1 | 11/2004 | Gauselmann | |
| 2004/0242297 | A1 | 12/2004 | Walker | |
| 2005/0026694 | A1 | 2/2005 | Kelly et al. | |
| 2005/0032573 | A1 | 2/2005 | Acres et al. | |
| 2005/0054429 | A1 | 3/2005 | Baerlocher et al. | |
| 2005/0059474 | A1* | 3/2005 | O'Halloran | 463/20 |
| 2005/0070356 | A1 | 3/2005 | Mothwurf | |
| 2005/0075163 | A1 | 4/2005 | Cuddy et al. | |
| 2005/0079908 | A1 | 4/2005 | Pacey | |
| 2005/0079911 | A1* | 4/2005 | Nakatsu | 463/26 |
| 2005/0096121 | A1* | 5/2005 | Gilliland et al. | 463/20 |
| 2005/0101374 | A1 | 5/2005 | Acres | |
| 2005/0101375 | A1 | 5/2005 | Webb et al. | |
| 2005/0101384 | A1 | 5/2005 | Parham | |
| 2005/0119047 | A1 | 6/2005 | Olive | |
| 2005/0143168 | A1 | 6/2005 | Torango | |
| 2005/0159211 | A1 | 7/2005 | Englman | |
| 2005/0176488 | A1 | 8/2005 | Olive | |
| 2005/0192083 | A1 | 9/2005 | Iwamoto | |
| 2005/0192099 | A1 | 9/2005 | Nguyen et al. | |
| 2005/0197180 | A1 | 9/2005 | Kaminkow et al. | |
| 2005/0209004 | A1 | 9/2005 | Torango | |
| 2005/0227754 | A1 | 10/2005 | Kaminkow et al. | |
| 2005/0239542 | A1 | 10/2005 | Olsen | |
| 2005/0267610 | A1 | 12/2005 | Shinoda | |
| 2005/0282626 | A1 | 12/2005 | Manfredi et al. | |
| 2006/0003829 | A1 | 1/2006 | Thomas | |
| 2006/0025210 | A1 | 2/2006 | Johnson | |
| 2006/0035694 | A1 | 2/2006 | Fuller | |
| 2006/0035706 | A1 | 2/2006 | Thomas et al. | |
| 2006/0040732 | A1 | 2/2006 | Baerlocher et al. | |
| 2006/0040736 | A1 | 2/2006 | Baerlocher et al. | |
| 2006/0052159 | A1 | 3/2006 | Cahill et al. | |
| 2006/0052161 | A1 | 3/2006 | Soukup et al. | |
| 2006/0052162 | A1 | 3/2006 | Soukup et al. | |
| 2006/0073889 | A1 | 4/2006 | Edidin et al. | |
| 2006/0073897 | A1 | 4/2006 | Englman et al. | |
| 2006/0178203 | A1 | 8/2006 | Hughes et al. | |
| 2007/0060316 | A1* | 3/2007 | O'Halloran | 463/25 |
| 2007/0060319 | A1 | 3/2007 | Block et al. | |
| 2007/0298873 | A1 | 12/2007 | Nguyen et al. | |

FOREIGN PATENT DOCUMENTS

| | | | |
|---|---|---|---|
| AU | 555905 | | 10/1986 |
| AU | 567001 | | 11/1987 |
| AU | 585160 | | 6/1989 |
| AU | 589158 | | 10/1989 |
| AU | 593059 | | 2/1990 |
| AU | 630112 | | 3/1990 |
| AU | 628330 | | 9/1992 |
| AU | 633469 | | 1/1993 |
| AU | 649009 | | 5/1994 |
| AU | 655801 | | 1/1995 |
| AU | 1996 70247 | | 4/1997 |
| AU | 680920 | | 8/1997 |
| AU | 710015 | | 9/1997 |
| AU | 733599 | | 10/1997 |
| AU | 722969 | | 6/1998 |
| AU | 1998 63553 | A | 10/1998 |
| AU | 1998 84162 | A1 | 3/1999 |
| AU | 707687 | | 7/1999 |
| AU | 1999 17318 | A1 | 9/1999 |

| | | | |
|---|---|---|---|
| AU | 709724 | | 9/1999 |
| AU | 711501 | | 10/1999 |
| AU | 714299 | | 12/1999 |
| AU | 716299 | | 2/2000 |
| AU | 721968 | | 7/2000 |
| AU | 722107 | | 7/2000 |
| AU | 728788 | | 1/2001 |
| AU | 2001 1000032 | | 11/2001 |
| AU | 2001 1000033 | | 11/2001 |
| AU | 748263 | | 5/2002 |
| AU | 749222 | | 6/2002 |
| AU | 754689 | | 11/2002 |
| AU | 758306 | | 3/2003 |
| DE | 3415114 | | 10/1985 |
| DE | 8710757 | | 11/1987 |
| DE | 3638100 | | 11/1988 |
| DE | 3917683 | | 12/1990 |
| DE | 4200254 | | 8/1993 |
| DE | 4301855 | | 7/1994 |
| DE | 19600787 | C2 | 5/1997 |
| DE | 19613455 | C2 | 8/1997 |
| DE | 19936196 | A1 | 1/2001 |
| EP | 0 342 797 | | 11/1989 |
| EP | 0 444 932 | | 2/1991 |
| EP | 0 449 433 | A2 | 10/1991 |
| EP | 0 798 676 | A1 | 10/1997 |
| EP | 0 874 337 | A1 | 10/1998 |
| EP | 0 926 645 | A2 | 6/1999 |
| EP | 0 944 030 | A2 | 9/1999 |
| EP | 0 945 837 | A2 | 9/1999 |
| EP | 0 981 119 | A2 | 2/2000 |
| EP | 0 984 408 | A2 | 3/2000 |
| EP | 0 984 409 | A2 | 3/2000 |
| EP | 1 003 138 | A2 | 5/2000 |
| EP | 1 467 329 | A2 | 10/2004 |
| EP | 1 498 860 | A1 | 1/2005 |
| EP | 1 513 114 | A2 | 3/2005 |
| EP | 1 528 516 | A2 | 5/2005 |
| EP | 1 528 517 | A2 | 5/2005 |
| GB | 912 685 | | 12/1962 |
| GB | 2 083 936 | A | 3/1982 |
| GB | 2 096 376 | A | 10/1982 |
| GB | 2 097 160 | A | 10/1982 |
| GB | 2 100 905 | A | 1/1983 |
| GB | 2 117 155 | A | 10/1983 |
| GB | 2 117 952 | A | 10/1983 |
| GB | 2 118 445 | | 11/1983 |
| GB | 2 144 644 | A | 3/1984 |
| GB | 2 137 392 | A | 10/1984 |
| GB | 2 139 390 | | 11/1984 |
| GB | 2 142 457 | A | 1/1985 |
| GB | 2 147 773 | | 5/1985 |
| GB | 2 148 135 | | 5/1985 |
| GB | 1 151 054 | A | 7/1985 |
| GB | 2 153 572 | A | 8/1985 |
| GB | 2 161 008 | A | 1/1986 |
| GB | 2 161 009 | A | 1/1986 |
| GB | 2 170 636 | A | 8/1986 |
| GB | 2 180 682 | A | 4/1987 |
| GB | 2 181 589 | A | 4/1987 |
| GB | 2 183 882 | A | 6/1987 |
| GB | 2 191 030 | A | 12/1987 |
| GB | 2 201 821 | A | 9/1988 |
| GB | 2 222 712 | A | 3/1990 |
| GB | 2 226 436 | A | 6/1990 |
| GB | 2 226 907 | A | 7/1990 |
| GB | 2 231 189 | | 11/1990 |
| GB | 2 282 690 | | 4/1995 |
| GB | 2 322 217 | A | 8/1998 |
| GB | 2 333 880 | A | 9/1998 |
| GB | 2 328 311 | | 2/1999 |
| GB | 2 353 128 | A | 2/2001 |
| GB | 2 383 668 | A | 11/2001 |
| GB | 2 387 703 | | 10/2003 |
| JP | 7148307 | | 6/1995 |
| JP | 2002-320703 | | 11/2002 |
| WO | WO 94 12256 | | 6/1994 |
| WO | WO 95 22811 | | 8/1995 |
| WO | WO 95 30944 | | 11/1995 |
| WO | WO 97 12338 | | 4/1997 |
| WO | WO 97 27568 | | 7/1997 |
| WO | WO 97 32285 | | 9/1997 |
| WO | WO 98 35309 | | 8/1998 |
| WO | WO 98 47115 | | 10/1998 |
| WO | WO 98 51384 | | 11/1998 |
| WO | WO 99 03078 | | 1/1999 |
| WO | WO 99 10849 | | 3/1999 |
| WO | WO 00 12186 | | 3/2000 |
| WO | WO 00 32286 | | 6/2000 |
| WO | WO 00 66235 | | 11/2000 |
| WO | WO 00 76606 | | 12/2000 |
| WO | WO 01 10523 | | 2/2001 |
| WO | WO 01 15055 | | 3/2001 |
| WO | WO 01 15790 | | 3/2001 |
| WO | WO 01 26019 | | 4/2001 |
| WO | WO 03 030066 | | 4/2003 |
| WO | WO 03 075235 | | 9/2003 |
| WO | WO 2004 035161 | | 4/2004 |
| WO | WO 2004 066061 | | 8/2004 |
| WO | WO 2005 027058 | | 3/2005 |
| WO | WO 2005 076193 | | 8/2005 |
| WO | WO 2005 081623 | | 9/2005 |
| WO | WO 2005 083599 | | 9/2005 |
| WO | WO 2005 099425 | | 10/2005 |
| WO | WO 2005 099845 | | 10/2005 |
| WO | WO 2005 106702 | | 11/2005 |
| WO | WO 2005 113093 | | 12/2005 |
| WO | WO 2006 014770 | | 2/2006 |
| WO | WO 2006 014883 | | 2/2006 |
| WO | WO 2006 014990 | | 2/2006 |
| WO | WO 2006 039366 | | 4/2006 |

OTHER PUBLICATIONS

Atronic Systems Progressive Products at G2E, published by Atronic in 2004, printed from ForRelease.com.
Austin Powers in Goldmember™ Advertisement written by IGT, published in 2003.
Big Shot!™ Advertisement published by Aristocrat Technologies, Inc., published in 2002.
Big Top Keno Advertisement published by Aristocrat Technologies, Inc., published in 2000.
*Cartoon Jackpots description*, printed from www.ballygaming.com/home.asp, on Feb. 4, 2005.
Cash Express Advertisements, written by Aristocrat, published in 2002.
Cashing in Article, written by Strictly Slots, published in Aug. 2006.
Fast Buck Systems Manual, written by International Game Technology, available to Mirage shift supervisors at least as early as May 30, 1990.
Hot Shot Progressive Article, written by Strictly Slots, published in Feb. 2006.
Jackpot Carnival Hyperlink Advertisement, written by Aristocrat, published prior to 2002.
Jackpot Hunter Advertisement, written by IGT, available prior to Jan. 2005.
Lemons, Cherries and Bell-Fruit-Gum written by Richard M. Bueschel, pp. 39-41, 64, 70, 137, 149-150, 195-196 and 251, 1995.
Lemons, Cherries and Bell-Fruit-Gum, pp. 1 to 4 and 304 to 314, written by Bueschel, published in Royal Bell Books in Nov. 1995.
Little Green Men Jr.™ Article written by Strictly Slots, published in Feb. 2003.
Magic 8 Ball Advertisement written by IGT, published in 2002.
Mikohn Product Catalog, Chapters 1, 2, 6, 7 and 8, written by Mikohn, published in Jan. 1993.
Mikohn Ripley's Believe It or Not Article written by Strictly Slots published in 2001.
Mikohn Super Controller Manual, Chapters 1 to 3 and 6 to 7, written by Mikohn, published in 1989.
Millioni$er articles, written by Strictly Slots, published in Sep. 2003 and Mar. 2004.
Money Grab Article written by Strictly Slots, published in Apr. 2001.
Money Time advertisement, written by Mikohn Gaming, published in 1999.

Money to Burn Brochure written by WMS Gaming, Inc., published prior to 2001.
Monte Carlo Advertisement written by Bally Gaming, published prior to Sep. 2002.
PEM—Precision Electronic Meter, written by GRIPS Electronic GmbH, printed from website reported as archived on Feb. 20, 1997 (available at http://web.archive.org/web/19970220165753/www.grips.com/pem.htm).
Penguin Pucks article, written by Note in Gaming Marketplace, published prior to 2004.
Pick a Prize Brochure written by Acres Gaming Incorporated, published prior to 2001.
Player Tracking on Slots, written by GRIPS Electronic GmbH, printed from website reported as archived on Feb. 20, 1997 (available at http://web.archive.org/web/19970220165921/www.grips.com/playtrac.htm).
Progressive Jackpot System article, printed from casinomagazine.com.managearticle.asp@c_290&a=518, on Jun. 21, 2004.
ProLINK Progressive Controller User/Reference Manual, written by Casino Data Systems, published in Apr. 1997.
Quick Pick Paytime Brochure written by Acres Gaming Incorporated, published prior to 2001.
Scarne's New Complete Guide to Gambling (© 1997)—John Scarne.
Slot Line Progressive Advertisement, written by IGT, published in 1993.
Slot Line Progressive Advertisement, written by IGT, published in 1994.
Slot Line Progressive Advertisement, written by IGT, published in 1995.
Slot Line Progressive Mega Jackpots Advertisement, written by IGT, published in 1997.
Slot Line Temperature Rising Game Description, written by IGT, published in 1998.
Slot Machines A Pictorial History of the First 100 Years (pp. 216, 242 to 243), 5th edition, written by Marshall Fey, published in 1983-1997.
Slot Machines and Coin-Op Games written by Bill Kurtz, pp. 16, 65, 105 and 111, 1991.
Slot Machines on Parade, 1st edition written by Robert N. Geddes and illustrated by Daniel R. Mead, published in 1980.
Super Cherry Advertisement written by IGT in 2001.
Take Your Pick Brochure and Article written by IGT/Anchor Games, Strictly Slots, published in 1999.
Top Dollar Brochure written by IGT, published in 1998.
*Wide Area Progressive Link System*, written by GRIPS Electronic GmbH, printed from website reported as archived on Feb. 20, 1997 (available at http://web.archive.org/web/19970220165457/www.grips.com/wap.htm).
Zorro Advertisement, written by Aristocrat, published in 2004.

* cited by examiner

FIG. 4

| PREDETERMINED OUTCOME | PREDETERMINED AWARD | PROBABILITY | WAGER AMOUNT | PAYLINE COUNT | EXPECTED VALUE |
|---|---|---|---|---|---|
| A | 100 | 1% | $1.25 | 5 | $100 |
| B | 50 | 1% | $3.00 | 12 | $50 |
| C | 25 | 2% | $2.00 | 2 | $30 |
| D | 10 | 3% | $1.00 | 10 | $25 |
| E | 5 | 8% | $3.00 | 3 | $5 |
| F | 1 | 10% | $2.00 | 8 | $1 |
| G | 0 | 75% | $1.00 | 1 | $0 |

FIG. 5

| PREDETERMINED OUTCOME | PREDETERMINED AWARD | PROBABILITY | WAGER AMOUNT | PAYLINE COUNT | EXPECTED VALUE |
|---|---|---|---|---|---|
| A | 100 | 1% | $1.25 | 5 | $100 |
| B | 50 | 1% | $3.00 | 12 | $50 |
| C | 25 | 2% | $2.00 | 2 | $30 |
| D | 10 | 3% | $1.00 | 10 | $25 |
| E | 5 | 8% | $3.00 | 3 | $5 |
| F | 1 | 10% | $2.00 | 8 | $1 |
| G | 0 | 75% | $1.00 | 1 | $0 |

FIG. 9

| AVAILABLE GAME AWARD | PROBABILITY | PREDETERMINED OUTCOME | WAGER AMOUNT | PAYLINE COUNT | EXPECTED VALUE |
|---|---|---|---|---|---|
| BONUS OUTCOME 1<br>BONUS OUTCOME 2 | 50%<br>50% | A | $1.25 | 5 | $100 |
| GAME OUTCOME 2<br>TRIGGERING EVENT 1 | 15%<br>85% | B | $3.00 | 12 | $50 |
| PROGRESSIVE OUTCOME 1<br>PROGRESSIVE OUTCOME 2 | 33%<br>67% | C | $2.00 | 2 | $30 |
| BONUS OUTCOME 2 | 100% | D | $1.00 | 10 | $25 |
| BONUS OUTCOME 3 | 100% | E | $3.00 | 3 | $5 |
| GAME OUTCOME 2<br>TRIGGERING EVENT 1 | 40%<br>60% | F | $2.00 | 8 | $1 |
| GAME OUTCOME 3<br>TRIGGERING EVENT 2 | 99%<br>1% | G | $1.00 | 1 | $0 |

GAMING DEVICE WITH DYNAMIC PROGRESSIVE AND BONUS ARCHITECTURE

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming machines which provide players awards in primary or base games are well known. Gaming machines generally require the player to place or make a wager to activate the primary or base game. In many of these gaming machines, the award is based on the player obtaining a winning symbol or symbol combination and based on the amount of the wager (e.g., the higher the wager, the higher the award). Symbols or symbol combinations which are less likely to occur usually provide higher awards.

In such known gaming machines, the amount of the wager made on the base game by the player may vary. For instance, the gaming machine may allow the player to wager a minimum number of credits, such as one credit (e.g., one cent, nickel, dime, quarter or dollar) up to a maximum number of credits, such as five credits. This wager may be made by the player a single time or multiple times in a single play of a primary game. For instance, a slot game may have one or more paylines and the slot game may allow the player to make a wager on each payline in a single play of the primary game. Slot games with 1, 3, 5, 9, 15 and 25 lines are widely commercially available. Thus, it is known that a gaming machine, such as a slot game, may allow players to make wagers of substantially different amounts on each play of the primary or base game ranging, for example, from one credit up to 125 credits (e.g., five credits on each of 25 separate paylines). This is also true for other wagering games, such as video draw poker, where players can wager one or more credits on each hand and where multiple hands can be played simultaneously.

Secondary or bonus games are also known in gaming machines. The secondary or bonus games usually provide an additional award to the player. Secondary or bonus games usually do not require an additional wager by the player to be activated. Secondary or bonus games are generally activated or triggered upon an occurrence of a designated triggering symbol or triggering symbol combination in the primary or base game. For instance, a bonus symbol occurring on the payline on the third reel of a three reel slot machine may trigger the secondary bonus game. When a secondary or bonus game is triggered, the gaming machines generally indicates this to the player through one or more visual and/or audio output devices, such as the reels, lights, speakers, video screens, etc. Part of the enjoyment and excitement of playing certain gaming machines is the occurrence of the secondary or bonus game (even before the player knows how much the bonus award will be). In other words, obtaining a bonus award is part of the enjoyment and excitement for players.

Progressive awards associated with gaming machines are also known. In one form, a progressive award is an award amount which includes an initial amount funded by a casino and an additional amount funded through a portion of each wager made on the progressive gaming machine. For example, 1% of each wager placed on the primary game of the gaming machine may be allocated to the progressive award or progressive award fund. The progressive award grows in value as more players play the gaming machine and more portions of the players' wagers are allocated to the progressive award. When a player obtains a winning symbol or symbol combination which results in the progressive award, the accumulated progressive award is provided to the player. After the progressive award is provided to the player, the amount of the next progressive award is reset to the initial value and a portion of each subsequent wager is allocated to that next progressive award as described above.

A progressive award may be associated with a single gaming machine or multiple gaming machines which each contribute portions of the progressive award. The multiple gaming machines may be in the same bank of machines, in the same casino or gaming establishment (usually through a local area network ("LAN")) or in two or more different casinos or gaming establishments (usually through a wide area network ("WAN")). Such progressive awards are sometimes called local area progressives ("LAP") and wide area progressives ("WAP"), respectively.

There is a continuing need to provide new and different gaming machines and gaming systems as well as new and different ways to provide awards to players including bonus awards and progressive awards. There is also a continuing need to provide new and different linked or related gaming machines.

SUMMARY

The present disclosure relates in one embodiment to a gaming system having a central controller and at least one gaming machine. The central controller and one or a plurality of gaming machines have a dynamic bonus and/or progressive architecture. Each gaming machine includes a game operable upon a wager placed by a player and having a paytable. The paytable includes or defines a plurality of winning outcomes and a plurality of losing outcomes for the game. The central controller designates one of the winning outcomes as a designated game outcome. If the gaming device generates that designated game outcome during a play of the game, the central controller determines a game event which: (1) does not modify the award associated with the designated outcome, (2) modifies the award associated with the designated outcome, (3) modifies the manner in which the award associated with the designated outcome is presented to the player, or (4) modifies the award associated with the designated outcome and the manner in which that award is presented to the player. After this determination, the central controller causes the gaming device to finish the play of the game with the determined game event and provide any awards associated with the determined game event to the player. If the gaming device does not generate that designated game outcome, the gaming device provides the player any award that is associated with the generated outcome in the paytable.

By programming the central controller to determine an award and a game event to present the award to the player for each designated game outcome, the dynamic bonus and/or progressive architecture adds or removes bonus and/or progressive capability to one or a plurality of the gaming machines without having to change the paytable of that gaming machine. This enables a game implementer or designer to change the manner in which players are provided awards, e.g., bonus or progressive awards, with reduced effort, replacement cost, and time.

In one embodiment, the central controller is programmed to provide one or more game events to one or a plurality of gaming machines in the gaming system when the gaming machine generates the designated game outcome in the game. Each game event enables a bonus award and/or a progressive award to be provided to a player of the gaming machine independent of the paytable associated with each game. In one embodiment, the central controller dynamically determines a bonus award and/or a progressive award in conjunction with a manner of presenting that bonus award and/or that progressive award to the player of the gaming machine.

In one embodiment, a gaming system is controlled by a central controller and includes a plurality of gaming machines. Each of the gaming machines includes a game operable upon a wager by a player, a plurality of different predetermined outcomes for the game and a plurality of different awards associated with the predetermined outcomes. The central controller is operable to designate one of the predetermined outcomes as a designated game outcome. It, however, should be appreciated that the designated game outcome could be otherwise suitably determined. The central controller is also operable to maintain a plurality of the game events. After an occurrence of the designated game outcome, the central controller is programmed to associate one or more of the game events with the designated game outcome and to select one or more of the game events. After the game event(s) is selected, the central controller provides the selected game event(s) to the gaming machine that generated the designated game outcome. The gaming machine utilizes the selected game event(s) to provide a bonus award and/or a progressive award to the player.

It should be appreciated that the game events may be any suitable type of game event such as a bonus award, a progressive award, a bonus game, a free spin, a free or discounted game, a triggering event for another game or award, or an audio and/or visual component. The awards may be fixed, such as a predetermined percentage or amount relative to the award associated with the generated game outcome in the paytable.

In one embodiment, the central controller is programmed to provide one or more game events to one or a plurality of gaming machines in the gaming system based on a play of any primary or secondary game on one of the gaming machines. In another embodiment, the central controller is programmed to provide one or more game events to one or a plurality of gaming machines in the gaming system independent of a play of any primary or secondary game on one of the gaming machines. For example, upon an occurrence of a suitable triggering event, the central controller is programmed to dynamically determine a bonus award and/or a progressive award in conjunction with a manner of presenting that bonus award and/or that progressive award to the player of the gaming machine.

In one embodiment, each gaming machine includes a game operable upon a wager by a player. Each gaming machine is operable to send game information to the central controller. The game information at least includes one or more predetermined outcomes in a paytable associated with the game. After receiving the game information, the central controller designates one or more of the predetermined outcomes in the paytable as a designated game outcome. If the designated game component is generated in a play of the game, the central controller determines a game event and associates the determined game event with that designated game outcome. For example, if a symbol combination of 7-7-7 is designated by the central controller as a designated game outcome and a gaming machine generates the designated game outcome of 7-7-7, the gaming machine requests the central controller to determine the award or result for the generated outcome. The central controller determines the award or result for the designated game outcome, if generated, in place of the predetermined award for the designated game outcome in the paytable. For example, instead of the designated game outcome of 7-7-7 paying 2000 credits (based on the paytable of that gaming machine), the central controller may determine to provide a substitute bonus game, a bonus award or a progressive award in place of the award in the paytable. Additionally, the central controller may provide an additional bonus award, an additional progressive award and/or another bonus or progressive feature. This determination may be random, predetermined or based on some other factor, such as a player's status as determined through a player tracking system.

In one embodiment, the central controller designates a plurality of winning outcomes as designated game outcomes. For example, in one embodiment, each game of the gaming machine is associated with a paytable. The paytable includes a plurality of predetermined winning outcomes and a plurality of predetermined awards associated with the predetermined winning outcomes. The central controller designates and selects a plurality of the predetermined winning outcomes as designated game outcomes. If one of the designated winning outcomes is generated in the game, the designated game outcome triggers the central controller to either provide an alternative game event, such as a bonus game, or to provide an additional game event, such as a bonus award added to any predetermined winning award associated with the designated game outcome. That is, the bonus and/or progressive architecture may replace or supplement awards generated in the game. It should be appreciated that the central controller may designate any suitable outcome in the game as a designated game outcome. That is, winning or losing outcomes in the game may be designated game outcomes, which when generated, trigger the bonus and/or progressive architecture of the present disclosure.

In one embodiment, the central controller determines the alternative or additional game event based on an average expected value of the designated winning outcome. The average expected value may be sent to the central controller along with game information in the paytable. For example, if the designated winning outcome of A♠A♣A♥-K♦-K♥ is generated in a play of the game, the gaming machine sends the average expected value of that winning outcome to the central controller. The central controller determines a game event which: (1) does not modify the award or expected value associated with the designated outcome, (2) modifies the award or expected value associated with the designated outcome, (3) modifies the manner in which the award or expected value associated with the designated outcome is presented to the player, or (4) modifies the award or expected value associated with the designated outcome and the manner in which that award or expected value is presented to the player. If the central controller does not modify the award or expected value, the central controller may provide the award to the player with a different bonus game having the same expected value. In this manner, the central controller provides the player with a different award presentation without substantially changing the average expected value of that award or game.

It should be appreciated that the gaming system may include any combination of the above embodiments. For example, the central controller may designate one outcome from a first gaming machine and provide a progressive award if that designated game outcome is generated by that gaming machine. For a second gaming machine, the central controller may designate a plurality of outcomes, provide a bonus game to a player if one of the designated game outcomes is generated by that gaming machine and provide a progressive award to a player if another designated game outcome is generated by that gaming machine.

It should be appreciated that the bonus and/or progressive award may be any suitable type of bonus and/or progressive award. In one embodiment, the award is a predetermined award. In another embodiment, the award is a progressive award, where a portion of each wager needed to initiate a game is allocated to the progressive award.

In one embodiment, the selected game event includes a bonus outcome. For example, the central controller provides the selected game event to the gaming device in the form of a bonus game. The bonus game may be determined in any suitable manner by an implementer or designer of the gaming system. In another embodiment, the selected game event includes a progressive outcome. For example, the central controller provides the selected game event to the gaming device in the form of a progressive outcome or award. The progressive outcome or award is randomly determined, predetermined or determined in some other manner by an implementer or designer of the gaming system. In an alternative embodiment, the central controller provides the selected game event to the gaming device in the form of a triggering event. Examples of such triggering events include symbol-driven triggering events and triggering events that occur randomly and independent of game play. In this alternative embodiment, the triggering event triggers the gaming device to provide the player with an alternative bonus game, a bonus award, a progressive award or any other suitable game event, outcome or award.

In the disclosed embodiments, the central controller provides the gaming device with audio, visual, audio-visual or other elements to vary game play and the manner in which awards are presented to the player. In one embodiment, the central controller provides the audio, visual, audio-visual or other elements along with the selected outcome. In another embodiment, the central controller provides the audio, visual, audio-visual or other elements upon the occurrence of a predetermined value/condition. In this embodiment, each audio element, visual element, audio-visual element or other element is associated with a predetermined value/condition. If the predetermined value/condition occurs in the gaming device, the central controller provides at least one audio, visual, audio-visual or other element to the gaming device. In one embodiment, the central controller randomly selects which audio, visual, audio-visual or other element to provide the gaming device. In another embodiment, the central controller provides a predetermined audio, visual, audio-visual or other element to the gaming device. For example, in operation this embodiment, the central controller provides the gaming device with audio sounds corresponding to the selected outcome. In operation of another embodiment, the central controller provides the gaming device with visual or audio-visual elements corresponding to the selected outcome. For example, such visual or audio-visual elements includes game graphics and game audio presented in a flash media presentation or other suitable audio-visual presentations.

The number of game events selected by the central controller and the amount of any awards provided to the player by the gaming device/system can vary and be determined in a variety of different manners in accordance with the embodiments disclosed herein. In one embodiment, one game event is selected to be provided to the gaming device in the gaming system. In another embodiment, one game event from a plurality of different game events is selected to be provided to the gaming device in the gaming system. In one such embodiment, the plurality of game events include bonus outcomes and/or progressive outcomes. In another embodiment, the central controller determines the amount of any awards associated with any selected game events based on the number of players or gaming devices in the gaming system at a designated time, for example, when the gaming machine generates the designated game outcome.

It should be appreciated that the central controller may associate different game events with designated game outcomes generated by different gaming machines. For example, a first set of game events are associated with a first designated game outcome generated by a first gaming machine and a second set of game events are associated with the first designated game outcome generated by a second gaming machine. In this manner, different gaming machines may provide different awards for the same designated game outcome. Alternatively, the central controller may associate the same game events for each designated game outcome generated by one or more of the gaming machines in the gaming system.

In another embodiment, the central controller associates different game events with designated game outcomes achieved by different players. For example, a player's status (as determined through a player tracking system) may determine, at least in part, which game events are associated with a designated game outcome. A player with a high status, such as a platinum or gold status, may be given the opportunity to win higher awards than a player with a low status. In such an instance, the game events associated with the designated game outcome achieved by a player with a high status provide that player with an opportunity to win higher awards than a player with a low status.

In an additional embodiment, certain game events may occur more frequently for a designated game outcome than other game events. For example, the game events may include a game outcome such as any symbol or symbol combination, any probability or hit frequency of certain game outcomes, a predetermined wager level, any bonus or progressive outcome and any triggering event.

In one embodiment, the gaming system is controlled by a central controller and includes a plurality of gaming machines or gaming devices. An alternative embodiment provides a gaming system having a plurality of linked gaming machines where one of the gaming machines functions as the central controller. The terms central server and central controller and the terms gaming machine, gaming device and gaming terminal are used interchangeably herein.

Each gaming machine of the gaming system may have one or a plurality of different games. The games of each gaming machine may be the same games or different games. In one embodiment, only one game of a multi-game gaming machine embodiment is associated with the designated award. That is, if a gaming machine has more than one game, only one game on that gaming machine is associated with the designated award. In another embodiment, each game of the gaming system has a possibility of triggering the designated award. In one embodiment, the player is only eligible to win the designated award by wagering a designated amount, such as the maximum amount of the wager. In another embodiment, a player is only eligible to win the designated award if the player wagers a side wager or side bet. In another embodiment, a player is only eligible to win the designated award if the player has a predetermined status (as determined through a player tracking system).

It is therefore an advantage of the present disclosure to provide a gaming system with a dynamic bonus and progressive architecture.

Another advantage of the present disclosure is to designate certain game outcomes in a game of a gaming machine that enable a bonus award and/or a progressive award to be provided to a player independent of the paytable of the game.

Another advantage of the present disclosure is to enable the addition or removal of bonus and progressive capability for one or more gaming machines dynamically without substantially changing the game software or a paytable associated with each gaming machine.

Another advantage of the present disclosure is to provide a bonus and progressive gaming system that can add or remove bonus and/or progressive capability dynamically without having to know the paytable beforehand and, more importantly, without making substantial changes to the game software.

A further advantage of the present disclosure is to enable a game implementer or designer to change the manner in which a player of a gaming machine is provided a bonus award and/or a progressive award with reduced effort, replacement cost, and time.

Another advantage of the present disclosure is to enable the replacement of an award associated with an outcome in a paytable with a different award if that outcome is designated.

Additional features and advantages of the disclosed embodiments are described in, and will be apparent from, the following Detailed Description of the Invention and the Figures.

BRIEF DESCRIPTION OF THE FIGURES

FIG. 4 is a table illustrating one sampling of a plurality of predetermined outcomes associated with a game provided by a gaming device and a plurality of predetermined awards associated with the plurality of predetermined outcomes.

FIG. 5 is a table illustrating one sampling of a plurality of predetermined outcomes associated with a game provided by a gaming device, wherein one of the predetermined outcomes is designated as a designated game outcome.

FIG. 9 is a table illustrating one sampling of a plurality of game events associated with a plurality of predetermined outcomes, wherein one or more of the predetermined outcomes may be designated as a designated game outcome.

DETAILED DESCRIPTION

The present disclosure may be implemented in various configurations for gaming machines or gaming devices, including but not limited to: (1) a dedicated gaming machine or gaming device, wherein the computerized instructions for controlling any games (which are provided by the gaming machine or gaming device) are provided with the gaming machine or gaming device prior to delivery to a gaming establishment; and (2) a changeable gaming machine or gaming device, where the computerized instructions for controlling any games (which are provided by the gaming machine or gaming device) are downloadable to the gaming machine or gaming device through a data network when the gaming machine or gaming device is in a gaming establishment. In one embodiment, the computerized instructions for controlling any games are executed by a central server, central controller or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 1A:
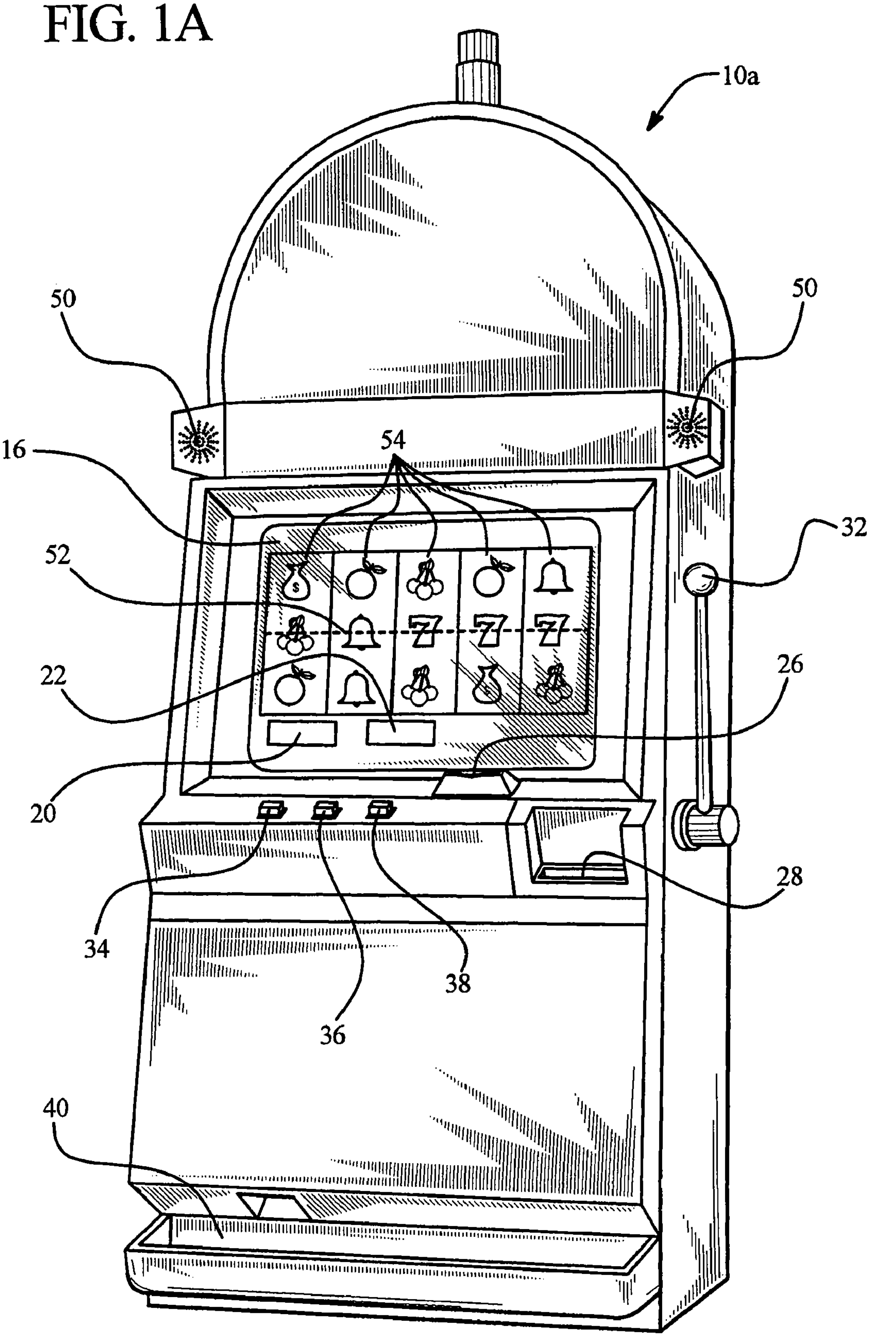
FIG. 1A is a front-side perspective view of one embodiment of the gaming device disclosed herein.
Figure 1B:
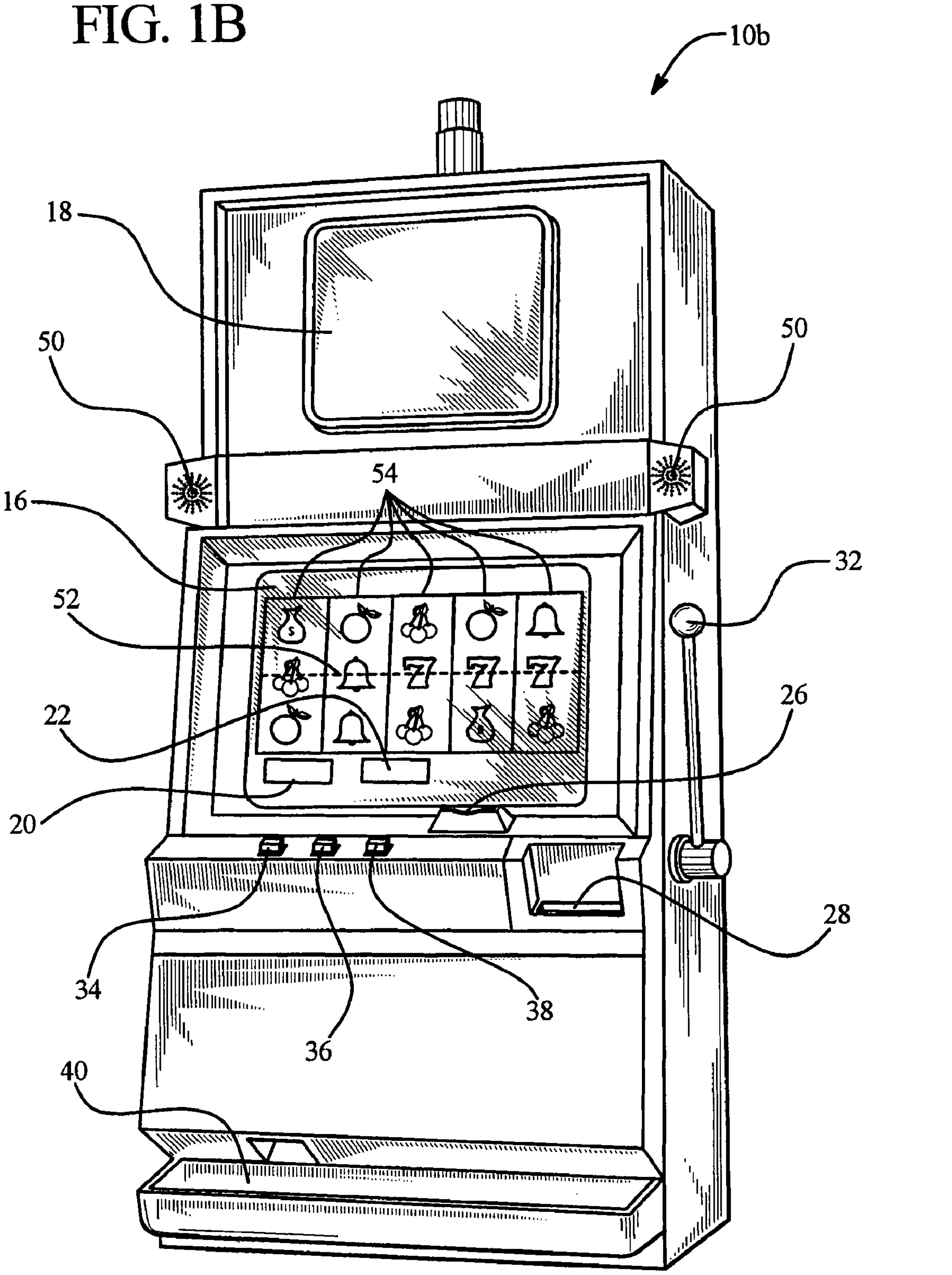
FIG. 1B is a front-side perspective view of another embodiment of the gaming device disclosed herein.

Referring now to the drawings, two example alternative embodiments of the gaming device of the disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
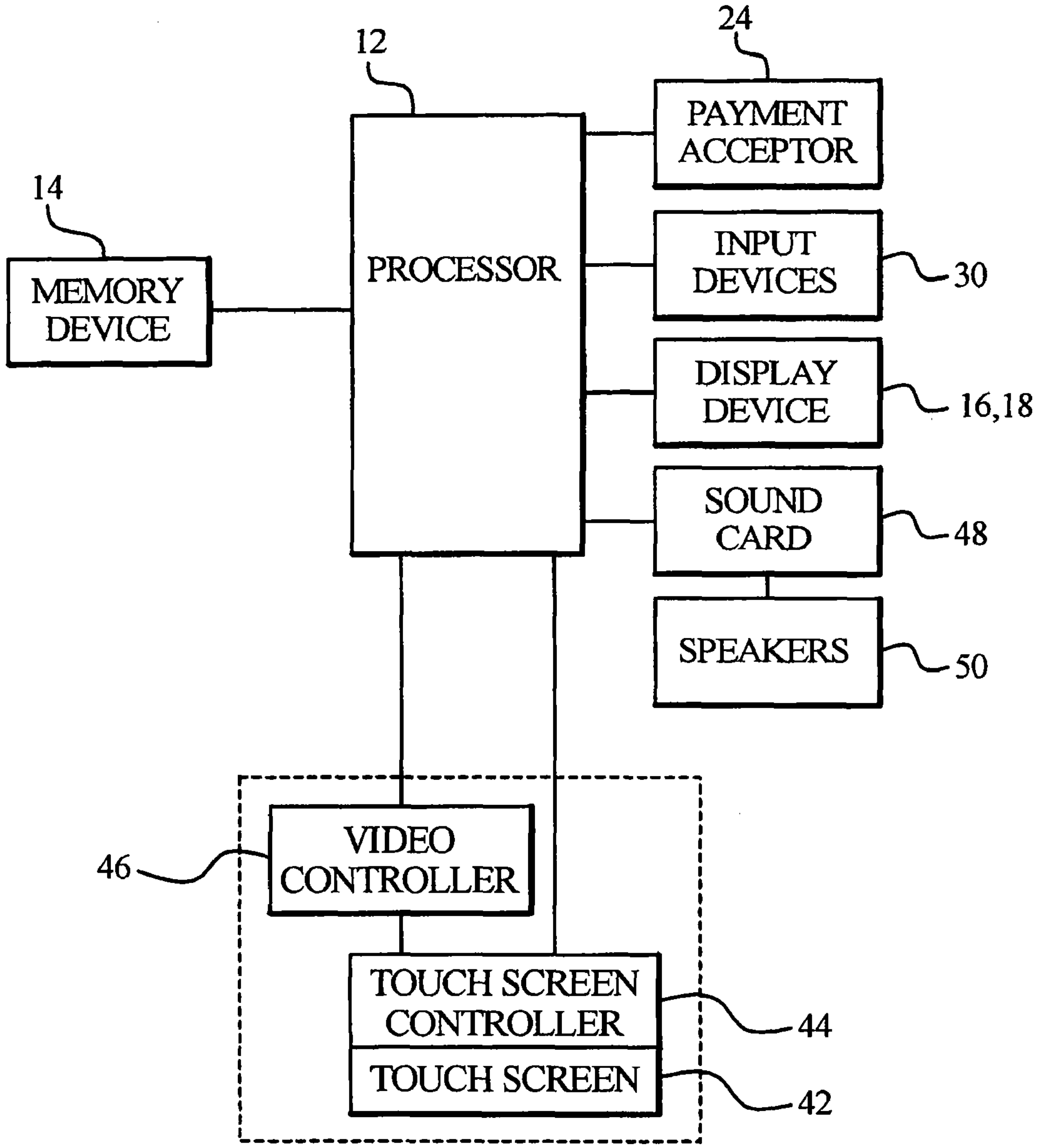
FIG. 2A is a schematic block diagram of the electronic configuration of one embodiment of the gaming device disclosed herein.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information and applicable game rules that relate to the play of the gaming device. In one embodiment, the memory device includes random access memory (RAM), which can include non-volatile RAM (NVRAM), magnetic RAM (MRAM), ferroelectric RAM (FeRAM) and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD or USB memory device. In other embodiments, part or all of the program code and/or operating data described above can be downloaded to the memory device through a suitable network.

In one embodiment, an operator or a player can use such a removable memory device in a desktop computer, a laptop personal computer, a personal digital assistant (PDA), portable computing device, or other computerized platform to implement the present disclosure. In one embodiment, the gaming device or gaming machine disclosed herein is operable over a wireless network, such as part of a wireless gaming system. In this embodiment, the gaming machine may be a hand held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted to the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated or not associated with the primary game and/or information relating to the primary or secondary game. These display devices may also serve as digital glass operable to advertise games or other aspects of the gaming establishment. As seen in FIGS. 1A and 1B, in one embodiment, the gaming device includes a credit display 20 which displays a player's current number of credits, cash, account balance or the equivalent. In one embodiment, gaming device includes a bet display 22 which displays a player's amount wagered.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LED), a display based on a plurality of organic light-emitting diodes (OLEDs), a display based on polymer light-emitting diodes (PLEDs), a display based on a plurality of surface-conduction electron-emitters (SEDs), a display including a projected and/or reflected image or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, and the like.

In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one or a plurality of game or other suitable images, symbols or indicia.

As illustrated in FIG. 2A, in one embodiment, the gaming device includes at least one payment acceptor 24 in communication with the processor. As seen in FIGS. 1A and 1B, the payment acceptor may include a coin slot 26 and a payment, note or bill acceptor 28, where the player inserts money, coins or tokens. The player can place coins in the coin slot or paper money, a ticket or voucher into the payment, note or bill acceptor. In other embodiments, devices such as readers or validators for credit cards, debit cards or credit slips may accept payment. In one embodiment, a player may insert an identification card into a card reader of the gaming device. In one embodiment, the identification card is a smart card having a programmed microchip or a magnetic strip coded with a player's identification, credit totals (or related data) and other relevant information. In another embodiment, a player may carry a portable device, such as a cell phone, a radio frequency identification tag or any other suitable wireless device, which communicates a player's identification, credit totals (or related data) and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B and 2A, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a pull arm 32 or a play button 34 which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, as shown in FIGS. 1A and 1B, one input device is a bet one button 36. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 38. The player may push the cash out button and cash out to receive a cash payment or other suitable form of payment corresponding to the number of remaining credits. In one embodiment, when the player cashes out, the player receives the coins or tokens in a coin payout tray 40. In one embodiment, when the player cashes out, the player may receive other payout mechanisms such as tickets or credit slips redeemable by a cashier (or other suitable redemption system) or funding to the player's electronically recordable identification card.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching the touch-screen at the appropriate places. One such input device is a touch-screen button panel. It should be appreciated that the utilization of touch-screens is widespread in the gaming industry.

The gaming device may further include a plurality of communication ports for enabling communication of the processor with external peripherals, such as external video sources, expansion buses, game or other displays, an SCSI port or a key pad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and the processor may incorporate that image into the primary and/or secondary game as a game image, symbol or indicia.

Gaming device 10 can incorporate any suitable wagering primary or base game. The gaming machine or device may include some or all of the features of conventional gaming machines or devices. The primary or base game may comprise any suitable reel-type game, card game, cascading or falling symbol game, number game or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented.

In one embodiment, as illustrated in FIGS. 1A and 1B, a base or primary game may be a slot game with one or more paylines 52. The paylines may be horizontal, vertical, circular, diagonal, angled or any combination thereof. In this embodiment, the gaming device includes at least one and preferably a plurality of reels 54, such as three to five reels 54, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels 54 are in video form, one or more of the display devices, as described above, display the plurality of simulated video reels 54. Each reel 54 displays a plurality of indicia or symbols, such as bells, hearts, fruits, numbers, letters, bars or other images which preferably correspond to a theme associated with the gaming device. In another embodiment, one or more of the reels are independent reels or unisymbol reels. In this embodiment, each independent or unisymbol reel generates and displays one symbol to the player. In one embodiment, the gaming device awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device with wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels, modifies the number of ways to win.

In another embodiment, the gaming device enables a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more or each of the reels and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to being based on how many paylines that would have passed through each of the strings of related symbols in active symbol positions).

In one embodiment, a base or primary game may be a poker game wherein the gaming device enables the player to play a conventional game of video draw poker and initially deals five cards all face up from a virtual deck of fifty-two card deck. Cards may be dealt as in a traditional game of cards or in the case of the gaming device, may also include that the cards are randomly selected from a predetermined number of cards. If the player wishes to draw, the player selects the cards to hold via one or more input device, such as pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the credits the player wagered.

In another embodiment, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are provided to the player.

In one embodiment, a base or primary game may be a keno game wherein the gaming device displays a plurality of selectable indicia or numbers on at least one of the display devices. In this embodiment, the player selects at least one or a plurality of the selectable indicia or numbers via an input device such as the touch screen. The gaming device then displays a series of drawn numbers to determine an amount of matches, if any, between the player's selected numbers and the gaming device's drawn numbers. The player is provided an award based on the amount of matches, if any, based on the amount of determined matches and the number of numbers drawn.

In one embodiment, in addition to winning credits or other awards in a base or primary game, the gaming device may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In other embodiments, the triggering event or qualifying condition may be by exceeding a certain amount of game play (such as number of games, number of credits, amount of time), or reaching a specified number of points earned during game play.

In another embodiment, the gaming device processor 12 or central server 56 randomly provides the player one or more plays of one or more secondary games. In one such embodiment, the gaming device does not provide any apparent reasons to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy in for a bonus game need be employed. That is, a player may not purchase an entry into a bonus game, rather they must win or earn entry through play of the primary game thus, encouraging play of the primary game. In another embodiment, qualification of the bonus or secondary game is accomplished through a simple "buy in" by the player, for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

Figure 2B:
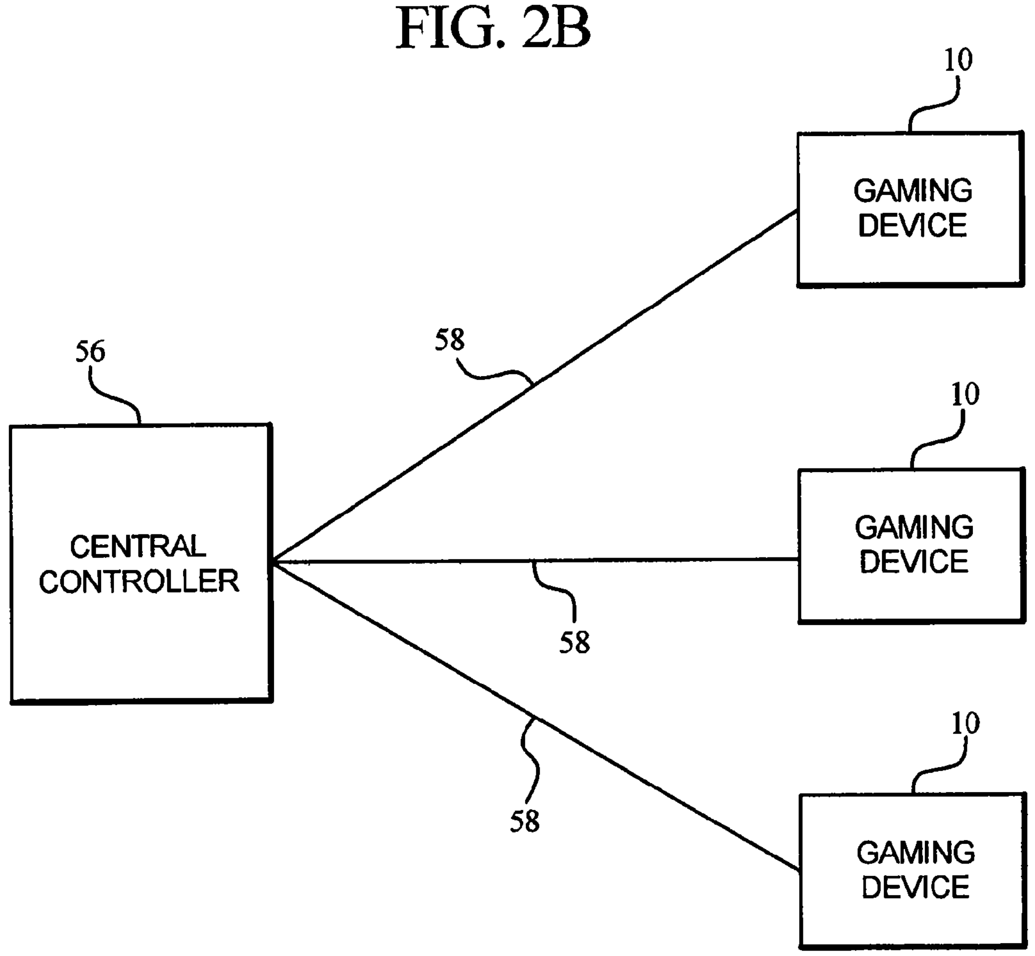
FIG. 2B is a schematic block diagram illustrating a plurality of gaming devices in communication with a central controller.

In one embodiment, as illustrated in FIG. 2B, one or more of the gaming devices 10 are in communication with each other and/or at least one central server, central controller or remote host 56 through a data network or remote communication link 58. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands or any other suitable data or signal between the individual gaming device and the central server. The gaming device processor is operable to execute such communicated events, messages or commands in conjunction with the operation of the gaming device. Moreover, the processor of the central server is designed to transmit and receive events, messages, commands or any other suitable data or signal between the central server and each of the individual gaming devices. The central server processor is operable to execute such communicated events, messages or commands in conjunction with the operation of the central server. It should be appreciated that one, more or each of the functions of the central controller as disclosed herein may be performed by one or more gaming device processors. It should be further appreciated that one, more or each of the functions of one or more gaming device processors as disclosed herein may be performed by the central controller.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, a predetermined game outcome value is determined for each of a plurality of linked or networked gaming devices based on the results of a bingo or keno game. In this embodiment, each individual gaming device utilizes one or more bingo or keno games to determine the predetermined game outcome value provided to the player for the interactive game played at that gaming device. In one embodiment, the bingo or keno game is displayed to the player. In another embodiment, the bingo or keno game is not displayed to the player, but the results of the bingo or keno game determine the predetermined game outcome value for the primary or secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card to each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment ensures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of if the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. In this embodiment, the gaming device and/or player tracking system tracks any players gaming activity at the gaming device. In one such embodiment, the gaming device and/or associated player tracking system timely tracks when a player inserts their playing tracking card to begin a gaming session and also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information, such as any amounts wagered, average wager amounts and/or the time these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer, or other internet facilitator is available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, downloading or streaming the game program over a dedicated data network, internet or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate a base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, a plurality of players at a plurality of linked gaming devices in a gaming system participates in a group gaming environment. In one embodiment, a plurality of players at a plurality of linked gaming devices work in conjunction with one another, such as playing together as a team or group, to win one or more awards. In one such embodiment, any award won by the group is shared amongst the different players of the group. The award may be shared equally or proportionately between the players of the group or shared in any other suitable manner, such disproportionately. In another embodiment, a plurality of players at a plurality of linked gaming devices competes against one another for one or more awards. In one such embodiment, a plurality of players at a plurality of linked gaming devices participates in a gaming tournament for one or more awards. In another embodiment, a plurality of players at a plurality of linked gaming devices play for one or more awards wherein an outcome generated by one gaming device affects the outcomes generated by one or more linked gaming devices.

Dynamic Changing of Awards and/or Presentation of Such Awards

Figure 3:
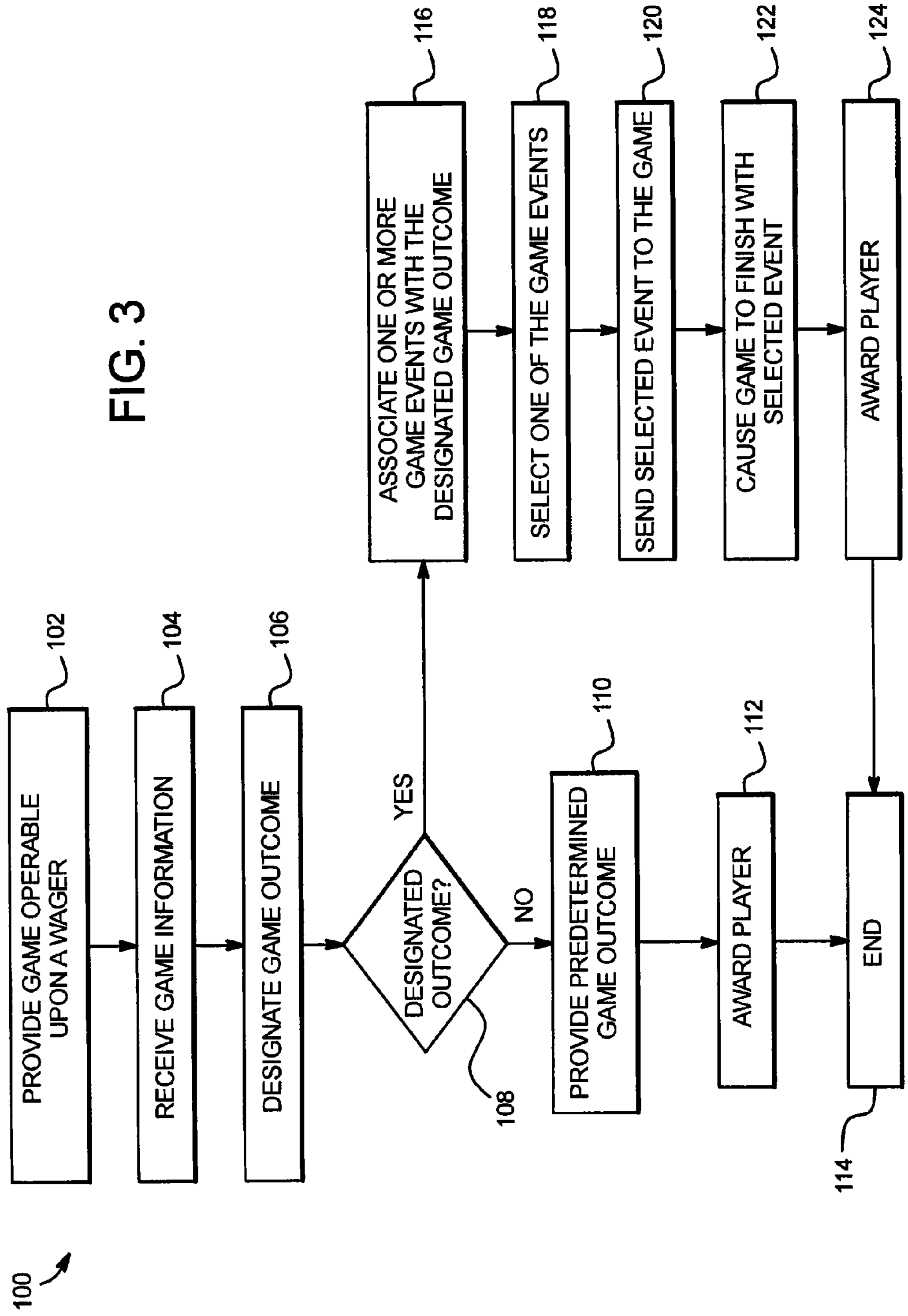
FIG. 3 is a flowchart of one embodiment of the gaming system herein disclosed illustrating a modification of at least one game outcome of a game provided by a gaming device when a designated game outcome is generated by the gaming machine.

A flowchart of an example process 100 for adding bonus and/or progressive capability to one or more gaming devices 10 is illustrated in FIG. 3. In one embodiment, the process 100 is embodied in one or more software programs stored in one or more memories and executable by one or more processors. Although the process 100 is described with reference to the flowchart illustrated in FIG. 3, it should be appreciated that many other methods of performing the acts associated with process 100 may be used. For example, the order of many of the blocks may be changed, and many of the blocks described may be optional.

Generally, the process 100 enables a central controller to add bonus and/or progressive capability to one or a plurality of gaming devices in the gaming system. The bonus and/or progressive capability is added at the controller level, which enables the addition of the bonus and/or progressive capability at the gaming device level without substantially changing a paytable of the gaming device. In one embodiment, the bonus and/or progressive capability enables a game implementer to change one or more bonus and/or progressive features associated with at least one of the gaming devices without substantially changing the primary game of those gaming devices. As a player plays one of the gaming devices, the gaming device generates a predetermined outcome, such as a predetermined symbol or a predetermined symbol combination, for each play of the game. If the central controller is programmed to add bonus and/or progressive capability, the central controller designates one or more of the predetermined outcomes to trigger certain bonus and/or progressive features selected by the central controller. In one embodiment, the central controller maintains a plurality of bonus and/or progressive features in the form of game events. If a designated game outcome is generated by the gaming device for a play of the game, the central controller is programmed to select one of the plurality of bonus and/or progressive features or game events. This selection may be random or made in any suitable manner. After this selection, the central controller is programmed to communicate the selected feature or game event to the gaming device. In response to receiving the selected feature or game event, the gaming device implements the selected feature or game event in the play of the game and provides the player of the gaming device with any award associated with the selected feature or game event.

For example, a predetermined outcome, such as a symbol combination of 7-7-7, may be associated with a predetermined award, such as 1000 credits, in the paytable of one of the gaming devices. If the central controller designates the predetermined outcome, and the predetermined outcome occurs in a game operable on the gaming device, the central controller determines whether to modify the predetermined award associated with the predetermined outcome. In one embodiment, the central controller determines to keep the predetermined award equal to 1000 credits, which is the same award associated with the predetermined outcome in the paytable of the gaming device. In such an embodiment, the central controller also determines whether to modify the manner in which the predetermined award is presented to the player. If the player won the predetermined award (i.e., by obtaining the predetermined outcome) in a slot game, the central controller may determine to provide the player with the predetermined award in a poker game or a bonus game. The poker game or bonus game constitutes an alternative ending to the slot game and each game provides the same predetermined award to the player. Such alternative endings enable the gaming device (or the central controller to cause the gaming device) to provide the predetermined award in a different manner.

In one embodiment, the central controller determines to modify the predetermined award. The central controller may modify the predetermined award by associating the predetermined outcome with a bonus and/or a progressive feature. In one example, the bonus and/or progressive feature includes a fixed award amount, such as 1500 credits. In this example, the central controller causes the gaming device to award the player with the fixed award amount, e.g., 1500 credits, for obtaining the designated outcome instead of awarding the player with 1000 credits from the paytable of the gaming device. Alternatively, the fixed award amount may be provided supplemental to the award associated with the designated outcome in the paytable (e.g., the player is provided with 2500 credits in the above example). In another example, the central controller causes the gaming device to award the player with 1000 credits as indicated by the paytable of the gaming device in addition to a free spin, a free or discounted game, a progressive award, an attempt to play for and win a progressive award, a modifier, such as a multiplier, a bonus game and/or an attempt to play for and win a bonus award.

In one embodiment, the bonus and/or progressive feature includes a fixed outcome. The fixed outcome includes a symbol, a symbol combination, an outcome of a bonus and/or secondary game or any other suitable fixed outcome. The fixed outcome may be associated with a predetermined award or a progressive award. In such an embodiment, the central controller determines to award the player with a fixed outcome, such as 1500 credits, when a designated outcome occurs in a primary or secondary game operable on the gaming device. For example, a designated outcome, such as a symbol combination of 7-7-7, may be associated with an award of 1000 credits in the paytable associated with the game of the gaming device. The average expected value of the designated outcome is 1000 credits. In this example, if the designated outcome of 7-7-7 occurs in the game, the central controller determines to modify the award associated with the designated outcome (e.g., 1000 credits) to a fixed outcome (e.g., 1500 credits) in the game or a bonus game. After the central controller determines to modify the award associated with the designated outcome, the central controller determines the manner in which the fixed outcome is provided to the player. That is, after the central controller determines to provide the player with a fixed outcome of 1500 credits, the central controller selects how to provide these credits to the player. The central controller may provide these credits to the player in a play of the primary game, in a play of a bonus game or in another award attempt. This enables the central controller to provide the same fixed outcome (e.g., 1500 credits) to the player in different ways, such as through different types of bonus games.

For example, the first time a player obtains the designated outcome of 7-7-7, the central controller may provide the player with a selection of selectable elements, wherein the player selected element or elements total the fixed outcome (e.g., 1500 credits). In this example, when the player obtains another designated outcome of 7-7-7, the central controller may enable the player to replay the primary game or provide an offer and acceptance game to the player. In one embodiment, the replay of the primary game and the offer and acceptance game constitute different manners of providing the fixed outcome (e.g., 1500 credits) to the player. In one such embodiment, the central controller randomly selects between the replay of the primary game or the offer and acceptance game and provides the player with the fixed outcome (e.g., 1500 credits) in the selected manner. It should be appreciated that any suitable method or game could be used to provide the fixed outcome to the player and that the central controller may determine or fix an outcome of the game and subsequently control the gaming device to produce the determined or fixed outcome. In different embodiments, examples of such games include, but are not limited to, reel/slot games, card games (e.g., poker, blackjack), lottery games, selection games, offer and acceptance games, wheel games, dice games, free spin games, competition games, skill games, perceived skill games or games that include one or more rounds of game play.

In one embodiment, the central controller determines which bonus game or event to associate with the designated outcome based on an average expected value of the designated outcome. For example, if a designated outcome is generated in a primary game at one of the gaming devices, the central controller determines whether to modify the award associated with the designated outcome and/or whether to provide the award associated with the designated outcome to the player of the gaming device in a different manner. In one embodiment, the designated outcome has an average expected value equal to an award associated with the designated outcome in a paytable of the primary game.

In one embodiment, the central controller randomly selects from a plurality of different types of bonus games or events having an average expected value. At least two of the games may have the same average expected value. In one embodiment, at least one of the bonus games or events have an average expected value that is equal to or greater than the average expected value of the designated outcome. In one embodiment, at least one of the bonus games or events has an average expected value that is less than the average expected value of the designated outcome.

In another embodiment, the central controller randomly selects a bonus game or event from a plurality of the bonus games or events. Each bonus game or event is associated with at least one paytable. Each paytable includes a plurality of outcomes and is associated with an average expected value. In this embodiment, the central controller randomly selects one of the bonus games or events based on the average expected value of the designated outcome. Based on the average expected value of the designated outcome, the central controller may determine to select a bonus game or event associated with an average expected value less than, equal to or greater than the average expected value of the designated outcome. Such a configuration enables the central controller to modify the award associated with the designated outcome (e.g., by selecting a bonus game or event having an average expected value that is greater than the average expected value of the designated outcome). This configuration also enables the central controller to modify the manner in which the award associated with the designated outcome is presented to the player (e.g., by selecting a bonus game or event having an average expected value that is equal to the average expected value of the designated outcome).

In one embodiment, the bonus and/or progressive feature includes a fixed award. The fixed award includes any award having a predetermined value or amount, such as a predetermined number of credits. In such an embodiment, the central controller determines to award the player with a fixed award, such as 2500 credits, when a designated outcome occurs in a game operable on the gaming device. For example, if a designated outcome, such as 7-7-7 occurs in the game, the central controller determines to modify the award associated with the designated outcome (e.g., 1000 credits) to a fixed amount, such as 2500 credits.

In one embodiment, the bonus and/or progressive feature includes a fixed percentage or a fixed amount of any awards obtained by the player. In such an embodiment, the central controller determines to award the player with a fixed percentage or a fixed amount of any award obtained in a game operable on the gaming device when a designated outcome is generated in the game. For example, if a designated outcome of 7-7-7 is associated with 1000 credits in the paytable of the gaming device and generated in the game, the central controller may modify the award associated with the predetermined outcome by a fixed percentage, such as 10%, or a fixed amount, such as 100 credits. The central controller provides the player with 1100 credits instead of 1000 credits as associated with the designated outcome in the paytable of the gaming device.

As described above, the central controller is programmed to add bonus and/or progressive capability to a gaming device in the process 100 in different ways. The process 100 begins by providing a game operable upon a wager by a player as indicated by block 102. Each gaming device of the gaming system may have one game or a plurality of different games. The game or games of each gaming device in the gaming system may be the same game or different games. Prior to awarding the player, the gaming device sends the central controller certain game information. The game information may include one or more predetermined outcomes for the game and an award associated with each of the predetermined outcomes. In one embodiment, the gaming device sends any information relating to a paytable associated with the game to the central controller. In one embodiment, the game information includes an average expected value of each of the predetermined outcomes in the paytable. In one embodiment, the gaming device sends the game information during the play of the game and the game information includes an amount wagered by the player, a number of paylines played by the player and/or an identifier of the game played by the player. The central controller receives this game information as indicated by block 104.

After receiving the game information, the central controller designates one or more of the predetermined outcomes in the game as a designated game outcome as indicated by block 106. This determination may be based, at least in part, on the game information received by the gaming device. For example, the central controller may be programmed to designate the predetermined outcome associated with the highest or lowest award (e.g., or average expected value) as a designated game outcome. Alternatively, this determination may be random, predetermined or determined in any other suitable manner. In one embodiment, the central controller is programmed to designate different predetermined outcomes in different games (which may be successive games). After the central controller selects the designated game outcome(s) from the predetermined outcomes in the game, the gaming device enables the player to play the game. It should be appreciated that the gaming device may or may not display the designated game outcome(s). In one embodiment, the designated game outcome is displayed on a paytable of the gaming device differently than other predetermined outcomes. For example, each designated game outcome may be highlighted, colored, illuminated or differentiated from other predetermined game outcomes in any suitable manner to indicate which of the predetermined game outcomes are designated game outcomes.

In one embodiment, the central controller designates one or a plurality of game outcomes as the designated game outcome for play of a game on the gaming device. Alternatively, the central controller designates one or a plurality of game outcomes as the designated game outcome for each play of the game. In different embodiments, the central controller designates one or a plurality of game outcomes as one or more designated game outcomes for a plurality of games and/or for a plurality of plays of the game.

Upon a play of the game at a gaming device, the gaming device generates an outcome for the game. The gaming device and/or the central controller determines if the outcome generated by the gaming device (and achieved by the player) in the game is the designated game outcome as indicated at block 108. If the generated outcome is not the designated game outcome, the gaming device provides the generated outcome to the player as indicated by block 110. The gaming device then provides an award, if any, associated with the generated outcome to the player as indicated by block 112. The award associated with the generated outcome is based on the paytable of the gaming device. After the player is provided with the award, if any, the game ends as indicated by block 114.

If the generated outcome is the designated game outcome, the central controller associates one or more game events (i.e., bonus and/or progressive features) to the designated game outcome as indicated by block 116. After this association, the central controller selects one or more of the game events as indicated by block 118. Each game event may modify an award, if any, associated with the generated and designated game outcome and/or modify the manner in which the award is provided or presented to the player.

The association and selection of game events as indicated by blocks 116 and 118 may be random, predetermined, determined based on probability, determined based on wager amount, determined based on a number of paylines played, determined based on an average win associated with the generated outcome, determined based on a player's status (as determined through a player tracking system) or determined in any other suitable manner. In one embodiment, certain game events are weighted to occur more frequently than other game events based on probabilities associated with the game events.

After the central controller selects the game event(s), the central controller sends a signal identifying the selected game event(s) to the gaming device as indicated by block 120. The signal may be any event, message, command or other suitable data or signal between the individual gaming device and the central controller. The signal is sent through a data network or remote communication link. After receiving the signal identifying the selected game event(s), the gaming device implements the selected game event(s) in the game. That is, the gaming device uses the selected game event(s) to finish the game as indicated by block 122. The selected game events may be stored and maintained in a memory of the central controller (or a storage device in communication with the central controller) and may include bonus outcomes, progressive outcomes, audio/visual presentations or any other suitable game events. If the selected game event(s) are associated with one or more awards, the gaming device provides the award(s) to the player as indicated by block 124. The award associated with the selected game event(s) are provided to the player in place of any award that may be associated with the designated game outcome from a paytable of the gaming device. After the player is provided with the award(s), the game ends as indicated by block 114.

In one embodiment, the central controller designates each predetermined outcome as a designated game outcome. For example, the central controller associates a different game event with each designated game outcome. In one embodiment, the central controller does not designate any of the predetermined outcomes as a designated game outcome for one or more plays of the game. In such an embodiment, the central controller removes the bonus and/or progressive features from the gaming device for one or more plays of the game. The game implementer or game operator may determine for which play(s) of the game the central controller designates or does not designate game outcomes. In another embodiment, the central controller randomly determines when to designate one or more of the predetermined outcomes as designated game outcomes. In an additional embodiment, the central controller designates one or more of the predetermined outcomes as designated game outcomes when a predetermined condition is met. The predetermined condition may be based on any number of factors, such as a minimum wager level placed by the player in the game, a minimum payback or hold percentage associated with the game, a side-bet placed by the player, a player's status (as determined by a player tracking system), a number of paylines played in the game, and/or any combination of these factors. For example, the central controller designates one or more of the predetermined outcomes as designated game outcomes when a player wagers a minimum wager level, which may be the maximum wager, for one or more plays of the game.

In one embodiment, the central controller causes the gaming device to delay the bonus and/or progressive feature. For example, the selected feature or game event may be a triggering event, which causes the central controller to delay the gaming device from providing the bonus and/or progressive feature or game event to a player of the gaming device. When the triggering event occurs or is determined to occur, the gaming device provides the bonus and/or progressive feature or game event to the player. That is, instead of providing the player an award based on the designated game outcome, the central controller determines that the player is selected for a delayed game event, such as a triggering event. When the triggering event occurs, the selected player is provided with an award or other game event associated with the triggering event based on the player achieving the designated game outcome in a previous play of the game. In this manner, the central controller determines for which player, for which game event and at which time the gaming device provides the bonus and/or progressive feature.

In another embodiment, the central controller enables a game implementer and/or a game operator to individually and independently set a contribution or hold rate for each designated outcome. That is, the central controller is configured to change one or more contributions or holdings associated with each designated outcome. For example, if a particular gaming device is configured to contribute or hold a predetermined percentage, such as 90% of player wagers on that gaming device, each outcome of that gaming device contributes a portion of the total hold percentage. The central controller enables the game implementer and/or the game operator to either change the overall hold percentage and/or to change the hold percentage associated with each designated outcome. This enables certain outcomes to contribute more holdings to a gaming establishment than other outcomes.

FIG. 4 illustrates a table showing a plurality of predetermined outcomes A-G associated with one of the gaming devices 10. The plurality of predetermined outcomes A-G are associated with a plurality of predetermined awards. Each possible predetermined outcome A-G is shown in the table of FIG. 4 although the gaming device may only generate one of the predetermined outcomes A-G in each play of the game. This table is representative of game information displayed by a paytable associated with the game that is provided by one of the gaming devices 10. For example, the paytable may display a plurality of the predetermined outcomes A-G and any predetermined awards associated with the predetermined outcomes A-G for one or more games provided by one of the gaming devices 10.

The table of FIG. 4 also illustrates a probability and an average expected value (i.e., an average win value) associated with each predetermined outcome A-G. In this example, the average expected value equals the predetermined award associated with each predetermined outcome A-G. It should be appreciated that the probabilities and average expected values shown in FIG. 4 may be changed or set by the implementer of the gaming system to any suitable value in the implementation of the gaming system disclosed herein.

Additionally, the table of FIG. 4 illustrates an amount wagered by a player of the gaming device and a number of paylines played by the player in the game when the gaming device generated one of the predetermined outcomes A-G. For example, FIG. 4 illustrates that the gaming device generated the predetermined outcome C for a play of the game wherein the player wagered $2.00 and played 10 paylines. It should be appreciated that the amount wagered values and the payline count values in FIG. 4 represent examples that may be used in the implementation of the various embodiments of the gaming device and gaming system disclosed herein. It should be appreciated that these values may differ for different players, different games and/or different gaming devices.

During each play of the game, the gaming device generates one of the outcomes A-G. The outcomes A-G include one symbol or a plurality of symbols forming a symbol combination. The outcomes A-G are generated by one or more symbol generators, such as a reel of a slot machine or a deck of playing cards. Each gaming device may include any suitable number of symbols and any suitable number of symbol generators to generate the outcomes A-G. As illustrated, the gaming device generates outcome A for approximately 1% of the plays of the game. Outcome A is associated with an award of 100 credits or monetary units and an average expected value of $100 (if each credit or monetary unit is $1). Examples of outcome A include a symbol combination of 7-7-7 on three reels of a slot machine, a hand ranking of A♠-A♣-A♥-K♦-K♥ in a poker game or a selection of "$100" in a player-selection game. In one embodiment, the average expected value associated with each predetermined outcome differs from the predetermined award associated with that predetermined outcome.

The predetermined outcomes, predetermined awards, probabilities, average expected values, amounts wagered by the player, and payline counts illustrated in FIG. 4 are representative of certain game information that the gaming device may communicate to the central controller. In embodiments where the gaming device includes a plurality of games, the gaming device may communicate a game identifier of the game played by the player to the central controller. The game identifier may identify the game being played by the player and the gaming device at which the player is playing in addition to any of the game information disclosed herein. The gaming device communicates the game information to the central controller in the form of a signal, such as any event, any message, any command or other suitable data or communication between the individual gaming device and the central controller. In one embodiment, the gaming device communicates or sends the game information to the central controller through a data network or remote communication link before the game starts. Based on some or all of this information, the central controller is operable to designate one or more of the predetermined outcomes as a designated game outcome. In one embodiment, the central controller randomly designates the designated game outcome without affecting a primary game of gaming devices in the gaming system (i.e., without substantially changing the software associated with the primary games). Alternatively, the designated game outcome may be predetermined or based on any number of suitable factors or functionalities, such as a minimum wager level placed by the player in the game, a side-bet placed by the player, a player's status (as determined by a player tracking system), a number of paylines played in the game, and/or any combination of these factors. As illustrated in FIG. 5, the central controller designated outcome C as the designated game outcome.

In one embodiment, the central controller causes a display device, such as a top display screen, a bottom display screen or an overhead display screen, to display the designated game outcome. The designated game outcome may be highlighted, colored, illuminated or differentiated from other predetermined outcomes in any suitable manner. In different embodiments, the designated game outcome is displayed before, during or after the player places a wager in the game. In another embodiment, the designated game outcome is not displayed to the player.

The gaming device and/or the central controller determines whether the predetermined outcome generated in the game is the designated game outcome as determined by the central controller. In one embodiment, a comparison algorithm is embodied in one or more software programs that are storable in one or more memories and executable by one or more processors in the gaming device and/or the central controller to determine whether the generated outcome is the designated game outcome. If the generated predetermined outcome in the game is not the designated game outcome (i.e., the predetermined outcome generated in the game does not match the game outcome designated by the central controller), the gaming device operates in a normal fashion. That is, the gaming device determines whether an award is associated with the generated predetermined outcome based on a paytable for the game and provides the predetermined award associated with the generated predetermined outcome, if any, to the player.

If the generated predetermined outcome in the game is the designated game outcome (i.e., the predetermined outcome generated in the game matches the game outcome designated by the central controller), the gaming device sends the game information to the central controller. After receiving the game information, which includes the generated designated game outcome, the central server associates one or more game events with the generated designated game outcome based on the received game information. For example, in one play of the game, the outcome A is associated with a symbol combination of 7-7-7. The central controller and the gaming device determine if the symbol combination of 7-7-7 was generated and/or designated. If the symbol combination of 7-7-7 is a designated game outcome and the gaming device generates the designated outcome of 7-7-7, the gaming device sends game information pertaining to the play of the game to the central controller. The game information may include the amount wagered by the player, the number of paylines wagered by the player and an average expected value (i.e., an average win value) associated with the symbol combination. Based on this game information, the central controller determines and/or selects which game event(s), such as which bonus outcome, which progressive outcome or which audio/visual presentation is associated with the designated symbol combination.

In one embodiment, the central controller selects the game event based on a number of paylines played in the game. If the player who achieved the designated game outcome played one payline, the central controller may provide a first game event. If the player who achieved the designated game outcome played three or five paylines, the central controller may provide a second game event. The first and second game events may be different values (e.g., the first game event has or is associated with a lower value than the second game event). Alternatively, the first game event may be associated with a fixed outcome in a bonus game or a fixed award. Alternatively, the central controller bases the selected game events on an amount wagered by the player.

In another embodiment, the central controller selects the game event based on an average expected value associated with the designated outcome generated in the game. For example, if the average expected value for a designated outcome is $100, the central controller may determine to provide the player with an offer/acceptance game that has an average expected value equal to or greater than $100. Alternatively, the offer/acceptance game may have an average expected value that is less than $100.

In one embodiment, if the designated outcome has a first average expected value, such as ranging from $0 to $100, the central controller may provide a first game event. If the designated outcome has a first average expected value, such as ranging from $101 to $250, the central controller may provide a second game event. The ranges for the first and second game events may, partially or entirely, overlap so that the designated outcome can be associated with the first and second game events. Alternatively, the central controller is operable to randomly select between a plurality of game events having different average expected values.

In one instance, the gaming device communicates the average expected value associated with the designated outcome to the central controller and the central controller determines to modify the award based on the average expected value of the designated outcome. The central controller may modify the award by a fixed amount or percentage. Alternatively, the central controller may modify the award by providing the player with a bonus and/or progressive attempt having a plurality of awards. In one embodiment, the plurality of awards includes at least one award that is greater than the average expected value of the designated outcome. In another embodiment, the plurality of awards are grouped into pools wherein at least one award in each pool is greater than the average expected value of the designated outcome.

Figure 6:
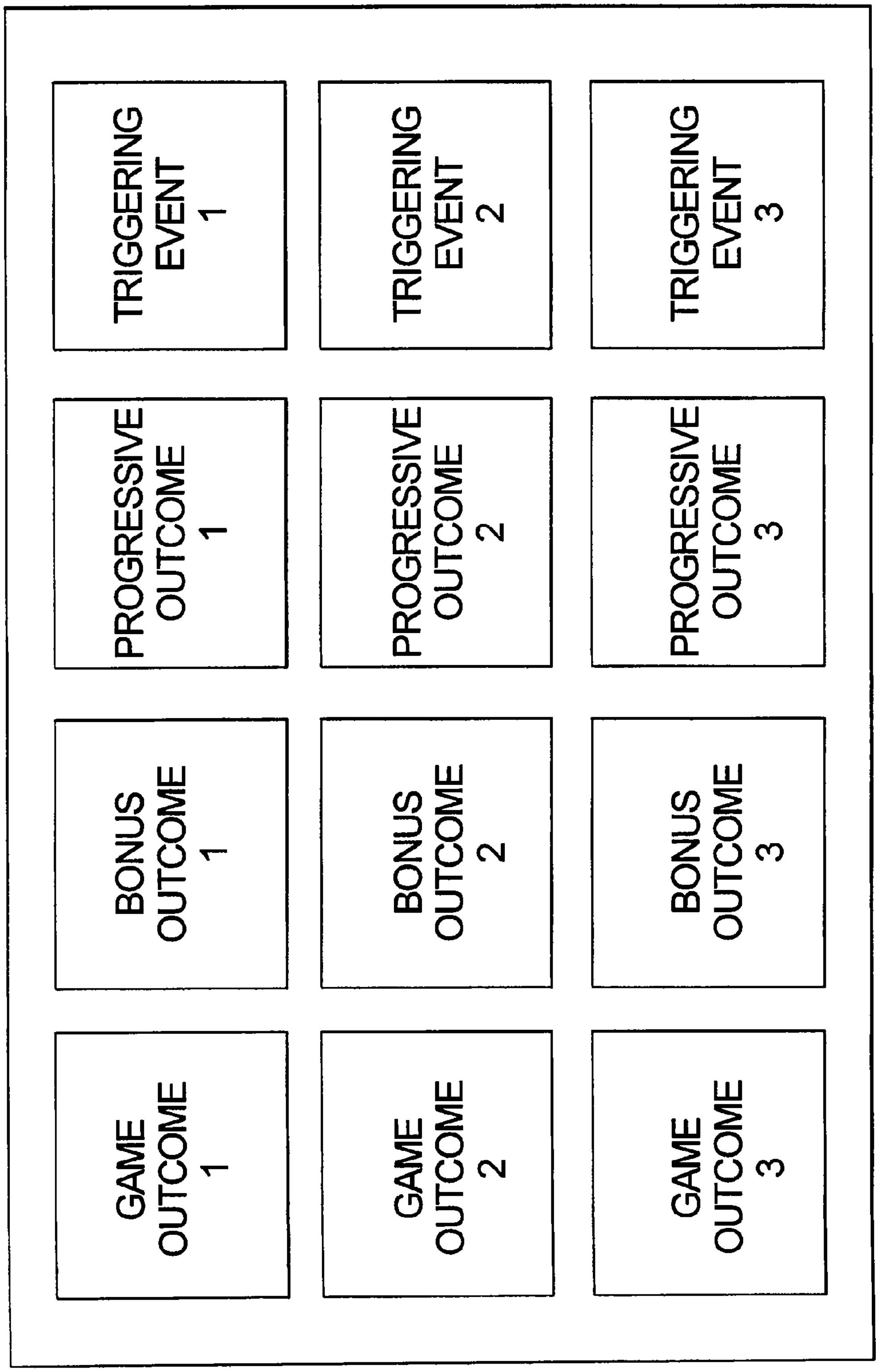
FIG. 6 is a table illustrating one sampling of a plurality of game events that may be associated with one or more designated game outcomes.

FIG. 6 illustrates a table of possible game events. The game events are stored or maintained in one or more memories or storage devices in communication with and accessible by the central controller. This configuration enables the game operator or game implementer to change, modify or update one or more game events at the controller level without substantially changing the paytables of the gaming devices in the gaming system. The game operator or game implementer may implement such changes, modifications or updates with reduced effort, replacement cost, and time.

In one embodiment, the central controller is programmed to include a plurality of new or different game events. Alternatively, the central controller is associated with another memory or storage device that stores a plurality of new or different game events. These configurations enable a plurality of new or different game events to be associated with a designated outcome without affecting the primary game of the gaming devices in the gaming system. The game events associated with the designated outcome can be changed without affecting, or changing, the primary game. In one instance, the software executed by the central controller and/or the processor of the gaming device to control or provide the primary game is not affected by changing the game events associated with one or more of the designated outcomes.

The central controller is programmed to associate one or more of the game events with each designated game outcome. The central controller determines which game event(s) to associate with each designated game outcome. In one embodiment, each possible game event is associated with a probability of being selected by the central controller. The central controller determines which game event(s) to associate with each designated game outcome based on the probabilities. For example, each possible game event is predetermined and associated with an equal probability of being associated with a designated game outcome. As illustrated in FIG. 6, the game events each have a probability of 1/12.

It should be appreciated that the probability associated with each game event may be weighted so that certain game events are more likely to be associated with a designated game outcome than other game events. For example, a first game event (e.g., bonus outcome 1) may be more likely to be associated with a designated game outcome than a second game event (e.g., progressive outcome 2). Alternatively, certain designated game outcomes are weighted to be associated with certain game events more frequently than other designated game outcomes. For example, the central controller may be programmed to: (i) associate a first designated game outcome (e.g., outcome A) with game events associated with low awards (e.g., bonus outcome 1), and (ii) associate a second designated game outcome (e.g., outcome F) with game events associated with high awards (e.g., progressive outcome 3).

In one embodiment, a plurality of possible game events are associated with a plurality of awards. For example, a first set of the game events includes a first game event (e.g., progressive outcome 1), a second game event (e.g., progressive outcome 2) and a third game event (e.g., progressive outcome 3). The game events in the first set may include different levels of awards or awards of different values. The first game event in the set (progressive outcome 1) is associated with a lower progressive award than the second game event in the set (progressive outcome 2) and the second game event in the set (progressive outcome 2) is associated with a lower progressive award than the third game event in the set (progressive outcome 3). In one embodiment, each game event in the set is associated with a minimum value, such as the average expected value associated with the designated game outcome. This enables the central controller to provide the player with an award that is greater than the award associated with the designated outcome from the paytable of the gaming device.

In one embodiment, certain designated outcomes are associated with certain game events. For example, a first designated outcome is associated with a first set of game events (e.g., game outcomes 1, 2 and/or 3) and a second designated outcome is associated with a second set of game events (e.g., progressive outcomes 1, 2 and/or 3). It should be appreciated any number of game events and any of the game events may be included in either of the first and second sets. Additionally, a plurality of game events may be maintained in and selected from any number of groups, sets or pools of game events.

In another example, a predetermined award is associated with the designated game outcome and each set of game events includes awards lower than, equal to and greater than the predetermined award. For example, a predetermined game outcome is associated with the predetermined award in a paytable of one of the gaming devices. If the central controller designates this predetermined game outcome as the designated game outcome, the central controller forms a second set of game events that includes a first game event (e.g., bonus outcome 1), a second game event (e.g., bonus outcome 2) and a third game event (e.g., bonus outcome 3). The first game event is associated with a bonus award having a value less than the predetermined award associated with the predetermined outcome. The second game event is associated with a bonus award having a value equal to the predetermined award associated with the predetermined outcome. The third game event is associated with a bonus award having a value greater than the predetermined award associated with the predetermined outcome. It should be appreciated that each game event may be associated with one or more awards and/or one or more sets or pools of awards.

It should be appreciated that each group, set or pool of game events may be associated with an average expected value. For instance, the central controller may select one of the game events based on the average expected value of each group, set or pool of game events and the average expected value of the designated outcome.

As illustrated in FIG. 6, the possible game events also include at least one progressive outcome. The progressive outcome includes one or more progressive awards which may or may not be displayed to the player. Each progressive award includes an award amount having an initial amount funded by a casino and an additional amount funded through a portion of each wager made on the gaming device. For example, 1% of each wager placed on the game of the gaming device may be allocated to the one or more progressive awards. The percentage of each wager may be split between the one or more progressive awards in any suitable manner. Each progressive award grows in value as more players play the gaming device and as more portions of the players' wagers are allocated to the progressive award. When the progressive outcome is associated with the designated game outcome, the central controller causes the gaming device to provide the accumulated progressive award to the player. After the progressive award is provided to the player, the amount of the next progressive award is reset to the initial value and a portion of each subsequent wager is allocated to the next progressive award as described above.

In one embodiment, the possible game events include different levels of a multi-level progressive configuration (MLP). The MLP includes a plurality of progressive awards at different progressive award levels. In one such embodiment, each progressive award is at a different level of the MLP and each level is associated with one of the designated outcomes. In one embodiment, the amount of the progressive award determines the progressive award level. In one such embodiment, a designated wager level, a designated player status (as determined through a suitable player tracking system) or any other suitable criteria or condition must be met for a player to be eligible for a designated level of the MLP.

For example, if a first designated outcome is generated at one of the gaming devices, the central controller provides (or causes the gaming device to provide) a first level of the MLP, wherein the player of the gaming device has an opportunity to win a first level progressive award. In an alternative embodiment, if the first designated outcome is generated at one of the gaming devices, the central controller provides (or causes the gaming device to provide) a first level progressive award of the MLP to the player. Each level of the MLP may be associated with the same designated outcome, or different designated outcomes. In one instance, a first generation of a designated outcome at one of the gaming devices in the gaming system enables a player to play for or win a first level progressive award and a second generation of the designated outcome at one of the gaming devices in the gaming system enables a player to play for or win a second level progressive award. Alternatively, the generation of different designated outcomes may enable a player to play for or win progressive awards of different levels in the MLP.

FIG. 6 also illustrates that the possible game events include at least one triggering event. The triggering event may be any suitable triggering event, such as symbol-driven triggering events or triggering events that occur randomly and independent of game play. In one embodiment, the triggering event triggers the gaming device to provide the player with a bonus game, a bonus award, a progressive award or any other suitable game event, outcome or award after the occurrence of the triggering event.

In one embodiment, the triggering event is symbol-driven and occurs based on a play of a game. That is, the triggering event occurs via a symbol or symbol combination in a primary game of the gaming device. For example, in one embodiment, the central controller associates the designated game outcome with a symbol-driven triggering event. When the gaming device generates the designated game outcome, the central controller and/or the gaming device provide the predetermined award associated with the generated designated game outcome to the player. Alternatively, the central controller and/or the gaming device notify the player through an appropriate message, signal or display that the triggering event was won and do not provide the predetermined award associated with the generated designated game outcome to the player. On a subsequent play of the game, the central controller causes the gaming device to generate the symbol or symbol combination associated with the symbol-driven triggering event in the primary game of the gaming device. Upon the occurrence of the triggering event, the central controller and/or the gaming device provide the player with a bonus game, a bonus award, a progressive award or any other suitable game event, outcome or award.

In another embodiment, the triggering event occurs randomly and independent of game play. For example, in one embodiment, the triggering event includes a random trigger number selected from a range of numbers. When the game is commenced, each game/player is allotted numbers from the same number range from which the random number was selected. That is, prior to each primary game, the central controller selects a random number from a range of numbers and during each primary game, the central controller allocates N number(s) in the range to the plurality of players. The previously selected random number is compared with the N number(s) allotted to the player(s). If there is a match between the trigger number and one of the player's allotted numbers, the central controller determines that the triggering event will occur and causes the triggering event to occur. For example, if the designated game outcome generated by the gaming device is associated with a triggering event that includes a random trigger number selected from a range of numbers, the central controller may cause a match between the trigger number and one of the player's allotted numbers on a subsequent play of the primary game. Upon the occurrence of the triggering event, the central controller and/or the gaming device provide the player with a bonus game, a bonus award, a progressive award or any other suitable game event, outcome or award.

In another embodiment, the triggering event includes a random trigger number selected from a range of numbers. When the game is commenced, each game/player is allotted numbers from the same number range from which the random number was selected, wherein one number in the range is allotted for each credit bet such that the player's probability of being awarded any award(s) is proportional to the wager amount. That is, prior to each primary game, the central server or other central controller selects a random number from a range of numbers and during each primary game, the central server or other central controller allocates the first N numbers in the range to each player, where N is the number of credits bet by the player in that primary game. The previously selected random number is compared with the N numbers allotted to the player(s). If there is a match between the trigger number and one of the player's allotted numbers, the central server or other central controller determines that the triggering event will occur and causes the triggering event to occur. For example, if the designated game outcome generated by the gaming device is associated with a triggering event that includes a random trigger number selected from a range of numbers, the central controller may cause a match between the trigger number and one of the player's allotted numbers on a subsequent play of the primary game. Upon the occurrence of the triggering event, the central controller and/or the gaming device provide the player with a bonus game, a bonus award, a progressive award or any other suitable game event, outcome or award.

In one embodiment, the central server or other central controller maintains one or more trigger values that are each associated with a separate range of values. In this embodiment, a triggering event will occur when the trigger value increments or increases to a value (i.e., a trigger hit value) within the range of values associated with that trigger value. For example, a triggering event will occur when the trigger value for a total wagered amount or a total coin-in increments to a trigger hit value of $500. In another example, a triggering event will occur when the trigger value for one progressive award increments to a progressive hit value of $2000. The trigger hit values can be randomly selected, predetermined or otherwise determined by the implementer or operator of the gaming system. For example, if the designated game outcome generated by the gaming device is associated with a triggering event that includes one or more trigger values, the central controller may cause the trigger value to increment or increase to the trigger hit value in a subsequent play of the game. Upon the occurrence of the triggering event, the central controller and/or the gaming device provide the player with a bonus game, a bonus award, a progressive award or any other suitable game event, outcome or award.

In different embodiments, the triggering event is predetermined, randomly determined, determined or weighted based on the player's wager, determined or weighted based on the status of one or more players (such as determined through a player tracking system), determined based on time, or determined based on any other suitable factor. In each of these different embodiments, after the gaming device generates the designated game outcome, the central controller and/or the gaming device may cause a triggering event associated with the designated game outcome to occur at any time.

In one embodiment, if the player leaves the gaming device before the occurrence of the triggering event, the central controller and/or the gaming device associates the player's eligibility for the triggering event with the player's player tracking account. This association may be stored on a player tracking card or through a player tracking system for a future or subsequent gaming session. In this manner, the player does not lose any bonus game, bonus award, progressive award or other suitable game event, outcome or award won in a previous gaming session.

In one embodiment, certain bonuses are triggered or determined to be provided to the player without substantially changing the base or primary game of the gaming machines. That is, upon an occurrence of a designated triggering event, such as a Nth coin, one or more game events may be provided to the player at the gaming machine. In one example, a first gaming machine and a second gaming machine are configured to enable players to play the same primary game. The first gaming machine is configured to award a bonus payout (or a bonus event with an average expected value) of $100. In this example, the central controller selects the bonus payout (or a bonus event with an average expected value) upon the occurrence of the triggering event. In this manner, different gaming machines may provide the same or different bonus games or events to different players without substantially changing the base or primary games of those gaming machines. In this instance, the game software associated with the base or primary games of those gaming machines is not substantially changed.

In one embodiment, the possible game events may also include at least one bonus outcome, such as a bonus game. In one embodiment, the bonus game may be any suitable bonus or secondary game and may differ from a primary game provided by the gaming device. After the designated outcome is generated in the primary game, the central controller determines whether to modify the award associated with the designated outcome in the paytable of the gaming device. For example, if the designated outcome is associated with 1000 credits or monetary units, the central controller determines whether to change the award (e.g., to 1200 credits or monetary units) or to present the same or unchanged award in a different way to the player. Different bonus outcomes, such as bonus and secondary games, offer the player different ways to receive changed or unchanged awards.

For example, in one embodiment, the bonus or secondary game is a player-selection game. In the player-selection game, the gaming device provides the player with a number of picks. The gaming device enables the player to use the picks to select from a number of selections. Each selection is associated with an award. The game ends when the player uses the number of picks in the game. In an alternative embodiment of the player-selection game, one or more of the selections are associated with a terminator, which ends the bonus game when selected by the player.

In another embodiment, the bonus or secondary game is an offer/acceptance game. In the offer/acceptance game, the gaming device provides the player with one or more offers and enables the player to accept or reject each offer. In one embodiment, the offer/acceptance game displays an award pool to the player and provides the player with an initial offer from the award pool. The award pool may include one or more awards based on the average expected value or other game information associated with outcomes in the paytable of the gaming device. If the player desires to keep the initial offer, the player makes an input into gaming device indicating such desire. If the player accepts an offer, the player is provided an award associated with the accepted offer. If the player does not like the initial offer, the player selects a reject offer input, wherein the gaming device randomly chooses another award from award pool to offer to the player. In one embodiment, the offer/acceptance game repeats this process a total of three times if the player rejects all offers, wherein the gaming device automatically provides the final offer (e.g., the fourth offer) to the player as an award.

It should be appreciated that other bonus outcomes may be provided to the player as determined by the game implementer or game operator. For example, in one embodiment, the bonus outcome includes a number of free spins in the primary game provided by the gaming device. In another embodiment, the bonus outcome includes a number of free plays of the primary game provided by the gaming device.

In one embodiment, the possible game events of FIG. 6 include at least one bonus outcome, such as a bonus award. In such an instance, if the outcome generated by the gaming device is the designated game outcome, the central controller causes the gaming device to supplement the predetermined award associated with the generated outcome with a bonus award. The bonus award may be randomly selected from an award pool including a plurality of bonus awards. Each bonus award may be associated with a probability and the central controller may weight the bonus awards so that certain bonus awards are selected more frequently than other bonus awards. In one embodiment, the bonus award is a modifier, such as a multiplier, which modifies the predetermined award associated. For example, the multiplier may be randomly determined, predetermined or determined in any other suitable manner.

In one embodiment, the bonus or game event determined by the central controller is provided at the discretion of the implementer of the gaming system. That is, the determination of whether to modify the award and/or to modify the manner in which the award is presented is discretionary. In one embodiment, certain criteria must be met before a player is eligible for the bonus or game event. In another embodiment, certain criteria must be met before the central controller causes the bonus or game event to be provided at one of the gaming devices in the gaming system. Such criteria includes a wager amount, a wager amount during a predetermined time period, a status of the player (as determined through a suitable player tracking system), a location of gaming device in the gaming establishment, a minimum payback of the primary game, and any other suitable factor or criteria. For example, a certain gaming machine may be designated to be provided a bonus event if located in a particular area of the gaming establishment or during a predetermined period of time, such as a particular time of day. It should be appreciated that a game implementer may use any criteria or condition for this determination, which is at the discretion of the implementer of the gaming system (e.g., when programming the central controller).

Figure 7:
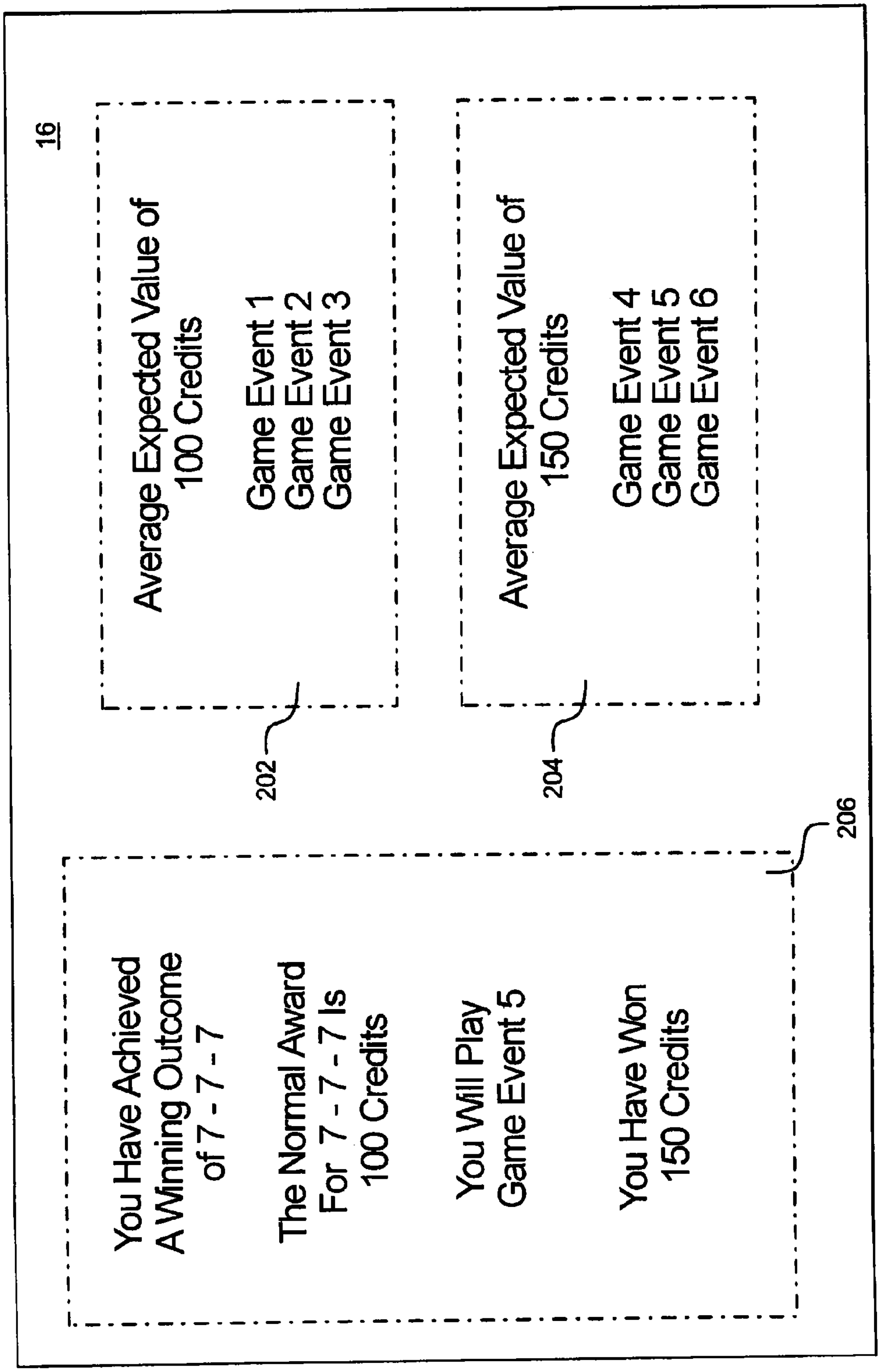
FIG. 7 is a front view of one example of a game play screen for one embodiment of the game described herein.

FIG. 7 illustrates one example of a game play screen for one embodiment of the game described herein. It should be appreciated that the display device 16 illustrates one example of a game play screen for one embodiment of the game described herein. For ease of illustration, the relevant game information for the game is shown on one display device 16 of one of the gaming machines 10. In alternative embodiments, the relevant game information for the game is divided between different areas of the gaming machine 10 or the display devices 16 and 18. Alternatively, the display device 18 is adapted to display the game play screen.

In one embodiment, the central controller is programmed to modify or determine to modify the manner in which the award or expected value is presented to the player of the game based on the average expected value and/or the game information in the paytable. For example, the central controller may be associated with one or more sets 202 and 204 of game outcomes or game events. As illustrated, each set 202 and 204 includes a plurality of game outcomes or events. Each set of game outcomes or events 202 and 204 is associated with a different average payout. As illustrated, the first set of game events 202 has an average expected value of 100 credits and the second set of game events 204 has an average expected value of 150 credits.

When a designated outcome is generated in a game, such as a primary game, at one of the gaming devices, the central controller causes the display device 16 to display information to the player. Such information may include appropriate messages, such as "YOU HAVE ACHIEVED A WINNING OUTCOME OF 7-7-7" and "THE NORMAL AWARD FOR 7-7-7 IS 100 CREDITS" in any suitable format, such as text, audio or visual formats. In one embodiment, the central controller is operable to send a SMS message to the player, such as to a cell phone, PDA or other communication or mobile device.

After designated outcome is generated in the game, the central controller determines which game event to provide the player. As described above, the central controller determines a game event which: (1) does not modify the award associated with the designated outcome, (2) modifies the award associated with the designated outcome, (3) modifies the manner in which the award associated with the designated outcome is presented to the player, or (4) modifies the award associated with the designated outcome and the manner in which that award is presented to the player. In one embodiment, the central controller determines the average expected value to be provided to the player and distributes the average expected value through a randomly selected game event. In one such embodiment, this distribution is random, predetermined or otherwise suitably determined.

As illustrated in FIG. 7, each game event 1, 2 and 3 of the first set 202 is associated with an average expected value of 100 credits and each game event 4, 5, and 6 of the second set 204 is associated with an average expected value of 150 credits. In FIG. 7, the central controller randomly selected game event 5 from the second set 204 to provide to the player. The central controller may cause the display device 16 to display this information to the player. Such information may include appropriate messages, such as "YOU WILL PLAY GAME EVENT 5," AND "YOU HAVE WON 150 CREDITS" in any suitable format, such as text, audio or visual formats. In one embodiment, the central controller is operable to send a SMS message to the player, such as to a cell phone, PDA or other communication or mobile device.

In an alternative embodiment, the central controller is associated with three game events 302, 304 and 306, such as first, second and third bonus games. Each game event 302, 304 and 306 is associated with at least one paytable. As illustrated, the game event 302 includes three paytables that each have a different average expected value. For example, paytable 1 is associated with an average expected value of 100 credits, paytable 2 is associated with an average expected value of 250 credits, and paytable 3 is associated with an average expected value of 500 credits.

Upon the generation of a designated outcome in the game at one of the gaming devices, the central controller selects one of the game events 302, 304 and 306 and a paytable associated with the selected game event. Once the game event is selected, the central controller sends the selected game event to the gaming device. The selected game event enables the gaming device to add bonus and/or progressive capability without substantially changing the gaming device (or the software thereof). Subsequent to this selection, the gaming machine uses the selected game event and associated paytable to play or finish play of the game. Accordingly, if the central controller selects the second paytable of the game event 304, the gaming device provides the player with game event 304 (e.g., game event 2 in FIG. 8) having an average expected value of 250 credits.

It should be appreciated that each paytable may include a plurality of outcomes of different values, wherein some of the values are less than the average expected value of the paytable and some of the values are greater than the average expected value of the paytable. If a player is provided with game event 304 (e.g., game event 2 in FIG. 8), the player may win an award that is less than, equal to or greater than the average expected value associated with the selected paytable (e.g., 250 credits) of the selected game event 304.

In another embodiment, each outcome of each paytable is associated with a designated average expected value. In one such embodiment, each game event is associated with at least one paytable including a plurality of outcomes, wherein each outcome is associated with an award. The awards associated with the outcomes determine the designated average expected value of the paytable including those outcomes. Such a configuration enables the central controller to select one of the game events, at least one paytable associated with the selected game event and at least one outcome associated with the selected paytable. In this embodiment, the central controller sends the selected game event, paytable and outcome to the gaming device which generated the designated outcome. The gaming device finishes the game with the selected game event, paytable and outcome and provides the appropriate award to the player.

Figure 8:
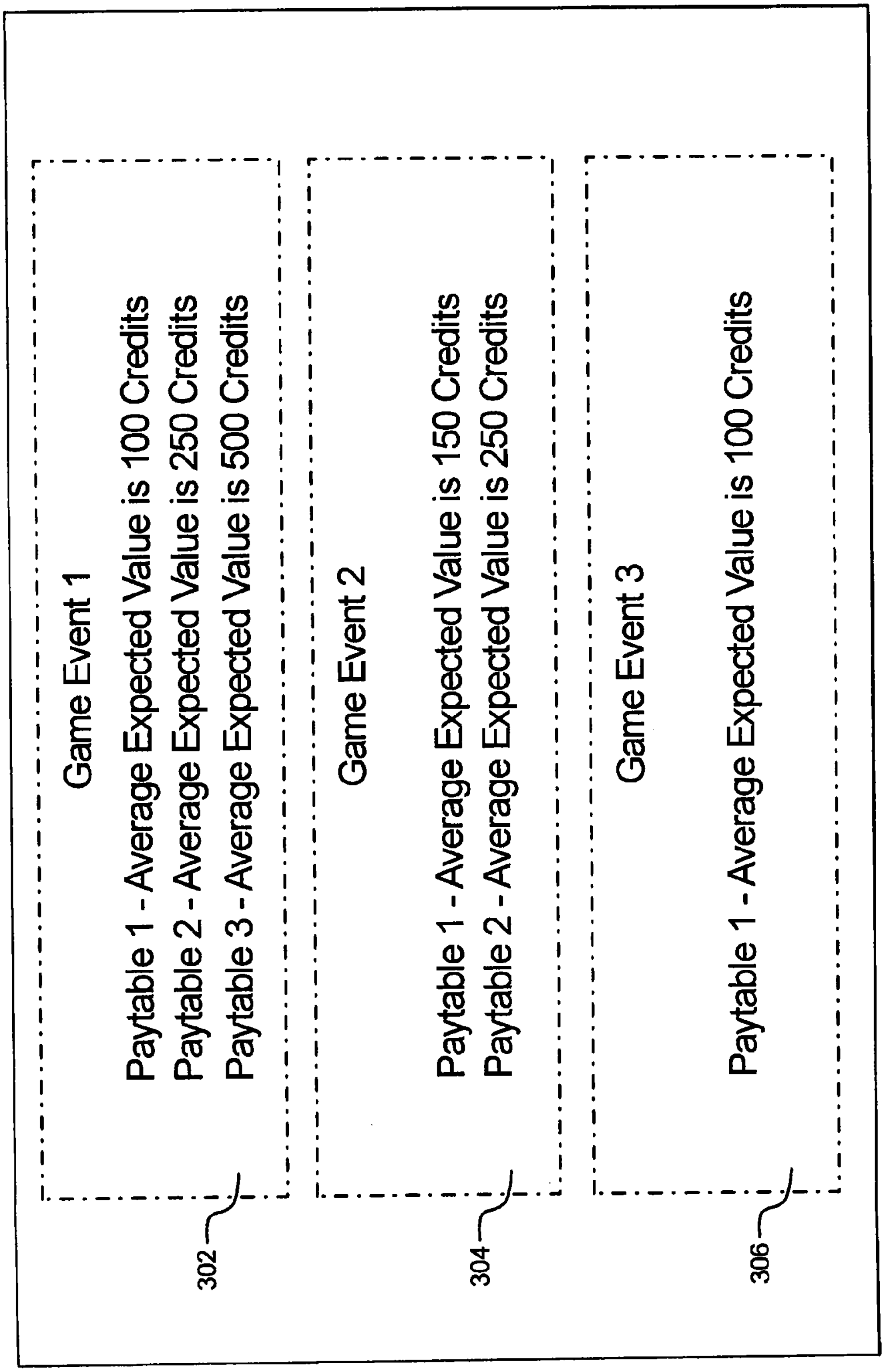
FIG. 8 is a chart illustrating one sampling of a plurality of game events that may be associated with one or more designated game outcomes.

In one embodiment, the game events include different game events and/or different types of bonus games, such as a selection game and a reel game. For example, as illustrated in FIG. 8, the game event 302 may be a selection game and the game event 306 may be a reel game. As illustrated, the first paytable of the game event 302 and the paytable of the game event 306 are associated with the same average expected values (e.g., 100 credits or monetary units).

In one embodiment, the possible game events include at least one game outcome, such as an alternative ending to the game. The alternative game ending includes a different game than the game provided by the gaming device. For example, if the game that generated the designated game outcome is a slot game, the alternative game ending may be provided to the player as a poker game. In such an instance, the gaming device in operation with the central controller provides the predetermined award and a selected bonus event, if any, associated with the designated game outcome to the player through a poker game instead of providing the player with the predetermined award through a slot game. The central controller and/or the gaming device processor controls the outcome of the poker game to provide the player with the predetermined award and the selected bonus event, if any. In another embodiment, the amount of the predetermined award is modified by a fixed amount or percentage in the alternative ending of the game.

In one embodiment, the alternative game ending is associated with an award that is higher than the predetermined award associated with the designated game outcome. For example, with outcome D as the designated game outcome, a first alternative game ending (game outcome 1) may be associated with 25 credits or monetary units, a second alternative game ending (game outcome 2) may be associated with 50 credits or monetary units and a third alternative game ending (game outcome 3) may be associated with 75 credits or monetary units. The central server selects one of the first, second or third alternative game outcomes and the gaming device provides the player with the selected alternative game outcome.

In one embodiment, the award associated with the selected alternative game outcome is provided to the player in addition to the predetermined award. Based on the above example, the player is provided with a total award of either 35 credits or monetary units, 60 credits or monetary units or 85 credits or monetary units depending on which of the alternative game endings is selected by the central controller.

In another embodiment, the alternative game ending provides the predetermined award to the player in an alternative format, such as through a flash media or another audio-visual presentation. For example, the central controller and/or the gaming device may cause a display device to display a plurality of reels which stop at a symbol or symbol combination totaling the amount of the predetermined award. In another example, the alternative game ending does not cause the gaming device to change or alter the game provided to the player. Rather, the alternative game ending enhances the award presentation to the player through suitable audio, visual and/or audio/visual presentations. For example, one or more audio, visual and/or audio/visual presentations may be associated with a designated game outcome. In this manner, if the designated game outcome is generated, the gaming device implements the one or more audio, visual and/or audio/visual presentations in the game when the designated game outcome is generated. The audio, visual and/or audio/visual presentation may be associated with a selected game event, so that the gaming device implements the presentation when the selected game event is implemented in the game.

FIG. 9 illustrates a table of possible game events associated with a plurality of designated game outcomes. As illustrated, outcomes A, B, C, F and G are associated with a plurality of game events and outcomes D and E are each associated with one game event. In one embodiment, if a designated game outcome is associated with a plurality of game events, the central controller selects one of the associated game events for each designated game outcome. The selection may be random, predetermined, determined based on probability, determined based on wager amount, determined based on a number of paylines played, determined based on an average win associated with the generated outcome, determined based on a player's status (as determined through a player tracking system) or determined in any other suitable manner.

In one embodiment, the central controller selects one of the associated game events for each designated game outcome based on a probability associated with each game event. For example, outcome A is associated with a first game event (e.g., bonus outcome 1) and a second game event (e.g., bonus outcome 2). Each game event has an equal probability of being selected by the central controller. For outcomes B, C, F and G, a first game event is weighted more heavily (i.e., occurs more frequently) than a second game event. It should be appreciated that the probabilities may be set at any value by the game implementer and/or game operator. Outcomes D and E are associated with one game event and the central controller selects the game event associated with outcome D and/or outcome E when the central controller designates outcome D and/or outcome E as the designated game outcome.

In one embodiment, the central controller selects one or more of the game event(s) associated with the designated game outcome based on the game information received from the gaming device. In one embodiment, the game information includes each predetermined outcome and the average expected value associated with each predetermined outcome. For example, if the predetermined outcome A is the designated game outcome, the central controller can determine that the predetermined outcome A is associated with an average expected value of 100 credits or monetary units based on the game information received from the gaming device. Because the predetermined outcome A is associated with a high average expected value (e.g., the highest expected value illustrated in FIG. 9), the central controller may select a game event, such as a bonus award, associated with a low average expected value, such as 10 credits or monetary units. For instance, the central controller provides the player with a bonus award of 10 credits or monetary units and a total award of 110 credits or monetary units. In another embodiment, the central controller may select a game event, such as a bonus award, associated with an average expected value of equal or greater value than the average expected value of the designated outcome. Alternatively, the central controller may select a game event associated with a fixed award, such as 110 credits or monetary units. In one embodiment, the central controller determines to provide a designated average expected value in a selected bonus event. In this embodiment, the central controller determines the designated average expected value and subsequently selects one of the bonus events based on the designated average expected value. In one embodiment, the central controller uses the designated average expected value as a minimum value and selects a bonus event having an average expected value greater than the minimum value. In another embodiment, the central controller selects a plurality of bonus events having an accumulated average expected value greater than the minimum value. In this embodiment, the central controller is operable to randomly distribute the average expected value through one or more selected bonus events. Such a configuration enables the central controller to modify the player's award without substantially changing the paytable of the gaming device.

In another embodiment, game events are grouped into pools or sets based on the game information received from the gaming device. For example, progressive outcome 1, progressive outcome 2 and bonus outcome 3 are grouped into a first pool and the other game events are grouped into a second pool. In such an instance, the central controller selects one or more of the game event(s) from the first pool based on the received game information. For example, if the designated game outcome is associated with an average expected value greater than a predetermined value, the central controller may associate one of the game events from the first pool with the designated game outcome. In another example, if the player's status is a predetermined level, such as gold or platinum, the central controller may associate one or more of the game events from the first pool with the designated game outcome. It should be appreciated that the game events may be grouped into any number of different pools with each pool including at least one game event. Additionally, each pool of game events may be associated with none, one, some or all of the designated game outcomes based on any number of factors, such as a minimum wager level placed by the player in the game, a side-bet placed by the player, a player's status (as determined by a player tracking system), and/or any combination of these factors.

After the central controller selects one or more of the game event(s) to associate with the designated game outcome, the central controller sends a signal to the gaming device. The signal informs the gaming device which game event(s) were selected by the central controller. After receiving the signal identifying the selected game event(s), the gaming device implements the selected game events in the game. Instead of providing a predetermined award to the player in a normal fashion (i.e., based on a paytable), the gaming device provides the game event(s) selected by the central controller to the player. In one embodiment, the selected game event(s) replace the predetermined award. In another embodiment, the selected game event(s) supplement the predetermined award. For example, a player plays the game at one of the gaming devices in the gaming system. The gaming device generates outcome B of FIG. 4 during the game. If outcome B is the designated game outcome, the gaming device may either (i) provide the player any game events selected by the central controller or (ii) provide the player the award associated with outcome B (e.g., 50 credits or monetary units) in addition to any game events selected by the central controller. In each case, the gaming device uses the selected game events to finish the game. By using the selected game events to finish the game, the gaming device enables the central controller to modify the manner by which the gaming device presents awards to the player. After the player is provided with the award associated with the designated game outcome, if any, the game ends.

In one embodiment, the gaming device provides the game to the player and generates one of possible outcomes in the game. After generating one of the possible outcomes, the gaming device sends a signal including the possible outcomes of the game to the central controller. After receiving this signal, the central controller designates one of the plurality of predetermined game outcomes as a designated game outcome. After this designation, the central controller associates a plurality of game events with the designated game outcome. In one embodiment, the central controller associates a first set of game events and a second set of game events to the designated game outcome. The first set of game events includes any bonus and/or progressive features, such as any bonus and/or progressive awards, and the second set of game events includes any audio, video and/or audio/visual presentations, such as flash media, rich media or any other digital media.

The central controller then selects one or more of the game event(s) to associate with the designated game outcome. For example, the central controller selects one of the game events from the first set and one of the game events from the second set. After the selection, the central controller sends a signal to the gaming device. The signal informs the gaming device which game events the central controller selected. After receiving the signal identifying the selected game events, the gaming device implements the selected game events in the game. In such an instance, the central controller provides a bonus and/or progressive feature along with an audio/visual feature. The gaming device uses the selected game events to finish the game. After the player is provided with the bonus and/or progressive award and the audio/visual award associated with the designated game outcome, the game ends.

It should be understood that the bonus and/or progressive feature described herein could be displayed to a player of one of the gaming devices in any suitable format. For example, in one embodiment, the central controller is operable with the display device to facilitate play of a primary game in a thick client environment. In this example, the primary game may be displayed to a player by a first display device (e.g., a bottom screen). In another embodiment, the central controller may facilitate play of a bonus game in a thin client environment based on the play of the primary game (i.e., the average expected value or other characteristic from the game paytable). In this embodiment, the bonus game is displayed to the player by a second display device (e.g., a top screen). The central controller is operable to send instructions to the gaming device to control and operate the primary game and/or any bonus games or events from a remote location.

In the various embodiments disclosed herein, it should be appreciated that game events of the bonus and/or progressive architecture may be funded in any suitable manner. In one embodiment, the game events are funded through portions of player wagers, such as through wagers made on the base or primary game. In another embodiment, the game events of the bonus and/or progressive architecture are funded through one or more departments of the gaming establishment. In each of these embodiments, the bonus and/or progressive architecture is not funded through the paytable associated with the primary game of the gaming devices. Accordingly, the addition of the bonus and/or progressive architecture does not affect the overall payback percentage of the primary game.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming device configured to operate in a gaming system including a central controller, said gaming device comprising:

at least one display device;

at least one input device;

at least one processor; and at least one memory device which stores a plurality of instructions, which when executed by the at least one processor, cause the at least one processor to operate with the at least one display device and the at least one input device to:

(a) enable a player to place a wager to play a game, said game associated with a paytable including a plurality of different game outcomes, and a plurality of awards associated with said game outcomes;

(b) if a designated game outcome is generated in the play of the game:

(i) send game information including an average expected value associated with the designated game outcome to the central controller, (ii) receive a determined game event from the central controller, wherein the game event is determined based on the average expected value associated with the designated game outcome, and (iii) provide any award associated with the determined game event to the player in place of any award associated with the designated game outcome; and (c) provide to the player any award associated with the game outcome generated in the play of the game if the generated game outcome is not the designated game outcome.

2. The gaming device of claim 1, wherein the designated game outcome is predetermined.

3. The gaming device of claim 1, wherein when executed by the at least one processor, the plurality of instructions cause the at least one processor to receive a signal including the designated game outcome from the central controller.

4. The gaming device of claim 1, wherein when executed by the at least one processor, the plurality of instructions cause the at least one processor to send information relating to the different game outcomes in the paytable to the central controller.

5. The gaming device of claim 1, wherein the designated game outcome is associated with one of the different game outcomes in the paytable.

6. The gaming device of claim 1, which includes a plurality of designated game outcomes, wherein each designated game outcome is associated with a different one of the game outcomes in the paytable.

7. The gaming device of claim 6, wherein the designated game outcomes are associated with a plurality of game events.

8. The gaming device of claim 1, wherein each designated game outcome is associated with at least one determined game event.

9. The gaming device of claim 1, wherein the determined game event is selected from a plurality of game events.

10. The gaming device of claim 1, wherein the determined game event includes at least one of: a bonus outcome, a progressive award, a bonus game, a free or discounted game, a free spin, a triggering event and an audio/visual component.

11. The gaming device of claim 1, which includes a plurality of game events, wherein the game events are each associated with a probability of being selected and at least one of the game events is selected based on the probabilities.

12. The gaming device of claim 1, wherein when executed by the at least one processor, the plurality of instructions cause the at least one processor to communicate a signal to the central controller, the signal including at least one of: an identification of the game, a wager amount placed by the player to play the game, a number of paylines played by the player in the game and the average expected value associated with each different game outcome of the game.

13. The gaming device of claim 12, wherein the game event is determined based on the signal.

14. The gaming device of claim 1, wherein the determined game event is determined from a first set of game events and a second set of game events, the first set of game events including a first type of game event and the second set of game events including a second type of game event.

15. A gaming system comprising:

at least one gaming device, each gaming device including:

at least one display device;

at least one input device;

at least one processor; and at least one memory device which stores a plurality of instructions, which when executed by the at least one processor, cause the at least one processor to operate with the at least one display device and the at least one input device to enable a player to place a wager to play a game, said game associated with a paytable including a plurality of different game outcomes and a plurality of awards associated with said game outcomes; and a central controller configured to operate with each of the gaming devices, said central controller programmed to:

(a) if a designated game outcome is generated in the play of the game of one of said gaming devices, (i) determine at least one game event having an average expected value, (ii) associate the determined game event with the designated game outcome, (iii) send the determined game event to said gaming device that generated the designated game outcome, and (iv) cause said gaming device to provide any award associated with the determined game event to the player in place of any award associated with the designated game outcome; and (b) if the generated game outcome is not the designated game outcome, cause the gaming device to provide to the player any award associated with the generated game outcome.

16. The gaming system of claim 15, wherein the central controller is programmed to receive information relating to the different game outcomes in the paytable associated with the game of one of the gaming devices.

17. The gaming system of claim 16, wherein the central controller is programmed to designate one of the different game outcomes in the paytable as a designated game outcome.

18. The gaming system of claim 15, wherein the central controller is programmed to communicate a signal including the designated game outcome to at least one of the gaming devices.

19. The gaming system of claim 15, wherein the central controller is programmed to designate a plurality of the game outcomes as designated game outcomes.

20. The gaming system of claim 19, wherein the designated game outcomes are associated with a plurality of game events.

21. The gaming system of claim 15, wherein each designated game outcome is associated with at least one determined game event.

22. The gaming system of claim 15, wherein the central controller is programmed to select the determined game event from a plurality of game events.

23. The gaming system of claim 15, wherein the determined game event includes at least one of: a bonus outcome, a progressive award, a bonus game, a free or discounted game, a free spin, a triggering event and an audio/visual component.

24. The gaming system of claim 15, which includes a plurality of game events, wherein the game events are each associated with a probability of being selected and the central controller is programmed to select at least one of the game events based on the probabilities.

25. The gaming system of claim 15, wherein when executed by the at least one processor of the earning device that generated the game outcome, the plurality of instructions cause the at least one processor of the gaming device that generated the game outcome communicate a signal to the central controller, the signal including at least one of: a name of the game, the gaming device that provided the game, a wager amount placed by the player to play the game, a number of paylines played by the player in the game and the average expected value associated with each different game outcome of the game.

26. The gaming system of claim 25, wherein the central controller is programmed to receive the signal and determines the game event based on the signal.

27. The gaming system of claim 15, wherein the determined game event is determined from a first set of game events and a second set of game events, the first set of game events including a first type of game event and the second set of game events including a second type of game event.

28. A method of operating a gaming device in a gaming system, said method comprising:

(a) causing at least one display device to display a play of a game upon a wager placed by a player, said game associated with a paytable including a plurality of different game outcomes and a plurality of awards associated with said game outcomes; and (b) if a designated game outcome is generated in the play of the game:

(i) sending game information including an average expected value associated with the designated game outcome to a central controller, (ii) receiving a determined game event from the central controller, wherein the game event is determined based on the average expected value associated with the designated game outcome, and (iii) providing any award associated with the determined game event to the player in place of any award associated with the designated game outcome; and (c) if the generated game outcome is not the designated game outcome, providing to the player any award associated with the generated game outcome.

29. The method of claim 28, wherein the designated game outcome is predetermined.

30. The method of claim 28, which includes receiving a signal including the designated game outcome from the central controller.

31. The method of claim 28, which includes sending information relating to the different game outcomes in the paytable associated with the game to the central controller.

32. The method of claim 28, wherein the designated game outcome includes one of the different game outcomes in the paytable.

33. The method of claim 28, wherein each designated game outcome of a plurality of designated game outcomes is associated with a different one of the game outcomes in the paytable.

34. The method of claim 33, wherein the designated game outcomes are associated with a plurality of game events.

35. The method of claim 28, wherein each designated game outcome is associated with at least one determined game event.

36. The method of claim 28, wherein the determined game event is selected from a plurality of game events.

37. The method of claim 28, wherein the determined game event includes at least one of: a bonus outcome, a progressive award, a bonus game, a free or discounted game, a free spin, a triggering event and an audio/visual component.

38. The method of claim 28, which includes selecting at least one of the game events based on a probability of being selected associated with each game event.

39. The method of claim 28, which includes communicating a signal to the central controller, the signal including at least one of: an identification of the game, a wager amount placed by the player to play the game, a number of paylines played by the player in the game and the average expected value associated with each different game outcome of the game.

40. The method of claim 39, wherein the game event is determined based on the signal.

41. The method of claim 28, wherein the game event is determined from a first set of game events and a second set of game events, the first set of game events including a first type of game event and the second set of game events including a second type of game event.

42. The method of claim 28, which is provided through a data network.

43. The method of claim 42, wherein the data network is an internet.

44. A method of operating a gaming system including at least one gaming machine, said method comprising:

(a) causing each of the gaming machines to display a play of a game upon a wager placed by a player, the game associated with a paytable including a plurality of different game outcomes and a plurality of awards associated with said game outcomes;

(b) if the designated game outcome is generated in the play of the game:

(i) determining at least one game event, (ii) associating the determined game event with the designated game outcome, and (iii) providing to the player any award associated with the determined game event; and (c) if one of the different game outcomes other than the designated game outcome is generated in the play of the game, providing to the player any award associated with the generated game outcome.

45. The method of claim 44, which includes designating one of the different game outcomes in the paytable as a designated game outcome.

46. The method of claim 45, which includes receiving a signal from the gaming machine whether the designated game outcome is generated in the play of the game.

47. The method of claim 44, which includes communicating the designated game outcome to the gaming machine.

48. The method of claim 44, which includes designating a plurality of the game outcomes as designated game outcomes.

49. The method of claim 44, which includes associating a plurality of the game events with a plurality of designated game outcomes.

50. The method of claim 44, which includes associating each designated game outcome with at least one determined game event.

51. The method of claim 44, wherein the determined game event includes at least one of: a bonus outcome, a progressive award, a bonus game, a free or discounted game, a free spin, a triggering event and an audio/visual component.

52. The method of claim 44, which includes selecting the determined game event from a plurality of game events.

53. The method of claim 52, which includes associating each game event with a probability of being selected and selecting at least one of the game events based on the probabilities.

54. The method of claim 44, which includes communicating a signal from the gaming machine to a central controller, the signal including at least one of: a name of the game, the gaming machine that provided the game, a wager amount placed by the player to play the game, a number of paylines played by the player in the game and the average expected value associated with each different game outcome of the game.

55. The method of claim 54, which includes determining the game event based on the signal.

56. The method of claim 44, which includes determining the game event from a first set of game events and a second set of game events, the first set of game events including a first type of game event and the second set of game events including a second type of game event.

57. The method of claim 44, which is provided through a data network.

58. The method of claim 57, wherein the data network is an internet.

* * * * *

UNITED STATES PATENT AND TRADEMARK OFFICE

CERTIFICATE OF CORRECTION

PATENT NO. : 7,914,377 B2
APPLICATION NO. : 11/557395
DATED : March 29, 2011
INVENTOR(S) : Benbrahim et al.

It is certified that error appears in the above-identified patent and that said Letters Patent is hereby corrected as shown below:

In Claim 25, Column 45, Line 38, replace “the earning” with --the gaming--.

In Claim 44, Column 46, Line 66, replace “the designated game outcome” with --a designated game outcome--.

Signed and Sealed this
Fourteenth Day of June, 2011

David J. Kappos
*Director of the United States Patent and Trademark Office*